United States Patent
Katsis et al.

(10) Patent No.: US 11,288,115 B1
(45) Date of Patent: Mar. 29, 2022

(54) ERROR ANALYSIS OF A PREDICTIVE MODEL

(71) Applicant: International Business Machines Corporation, Armonk, NY (US)

(72) Inventors: Ioannis Katsis, San Jose, CA (US); Christine T. Wolf, Newman, CA (US); Dulce B. Ponceleon, Palo Alto, CA (US); Yunyao Li, San Jose, CA (US); Rajasekar Krishnamurthy, Campbell, CA (US); Shivakumar Vaithyanathan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/090,200

(22) Filed: Nov. 5, 2020

(51) Int. Cl.
   *G06F 11/00* (2006.01)
   *G06F 11/07* (2006.01)

(52) U.S. Cl.
   CPC ........ *G06F 11/079* (2013.01); *G06F 11/0736* (2013.01); *G06F 11/0751* (2013.01); *G06F 11/0769* (2013.01)

(58) Field of Classification Search
   CPC .. G06F 11/008; G06F 11/079; G06F 11/3409; G06F 11/3452; G06F 11/3604;
   (Continued)

(56) References Cited

U.S. PATENT DOCUMENTS

| 4,697,242 | A | 9/1987 | Holland et al. |
| 6,513,025 | B1 | 1/2003 | Rosen |

(Continued)

FOREIGN PATENT DOCUMENTS

| CN | 109376240 | 2/2019 |
| CN | 110827808 | 2/2020 |

(Continued)

OTHER PUBLICATIONS

Liu et al., "Towards better analysis of machine learning models: A visual analytics perspective," Visual Informatics 1, Jan. 18, 2017, 9 pages.

(Continued)

*Primary Examiner* — Sarai E Butler
(74) *Attorney, Agent, or Firm* — Amin, Turocy & Watson, LLP

(57) ABSTRACT

Embodiments are provided for analysis of errors of a predictive model. In some embodiments, a system can include a processor that executes computer-executable components stored in memory. The computer-executable components can include an overview component that causes a client device to present first data identifying an error corresponding to a cell of a confusion matrix for a classification model, the error representing a mismatch between a first label generated by the classification model and a second label corresponding to a ground-truth observation. The computer-executable components also can include an element view component that receives second data defining a root cause of the error. The computer-executable components can further include an error annotation component that can embed the second data into a first data structure containing the first data, resulting in a first annotated data structure.

20 Claims, 21 Drawing Sheets

(58) Field of Classification Search
CPC ............. G06F 11/0736; G06F 11/0751; G06F 11/0769
USPC ........................................................ 714/1–57
See application file for complete search history.

(56) References Cited

U.S. PATENT DOCUMENTS

| | | | |
|---|---|---|---|
| 7,921,336 B1* | 4/2011 | Booth ................. | G06F 11/0727 714/48 |
| 8,626,682 B2 | 1/2014 | Malik et al. | |
| 9,904,257 B2 | 2/2018 | Thiele | |
| 10,545,412 B2 | 1/2020 | Chang et al. | |
| 2003/0088565 A1 | 5/2003 | Walter et al. | |
| 2008/0154807 A1* | 6/2008 | Chow ................. | G06K 9/6253 706/12 |
| 2008/0201279 A1* | 8/2008 | Kar ....................... | G06Q 30/02 706/12 |
| 2012/0096316 A1* | 4/2012 | Suit ..................... | G06F 11/0709 714/37 |
| 2013/0159778 A1* | 6/2013 | Yabuki ................ | G06F 11/3495 714/37 |
| 2014/0223238 A1* | 8/2014 | Allen ..................... | G06F 21/54 714/38.1 |
| 2017/0091320 A1* | 3/2017 | Psota ................... | G06F 16/334 |
| 2018/0012145 A1 | 1/2018 | Maurya | |
| 2018/0165604 A1 | 6/2018 | Minkin et al. | |
| 2018/0336362 A1* | 11/2018 | Guttmann ................ | G06N 3/08 |
| 2019/0034822 A1* | 1/2019 | Farre Guiu ........ | G06K 9/00718 |
| 2019/0392819 A1 | 12/2019 | Shin et al. | |
| 2021/0357281 A1* | 11/2021 | Malboubi ........... | G06F 11/0751 |

FOREIGN PATENT DOCUMENTS

| | | |
|---|---|---|
| JP | 6271379 | 4/2016 |
| JP | 2016057152 | 4/2016 |
| KR | 20190096307 | 8/2019 |

OTHER PUBLICATIONS

Amershi et al., "ModelTracker: Redesigning Performance Analysis Tools for Machine Learning," Proceedings of the 33rd Annual ACM Conference on Human Factors in Computing Systems—CHI '15, 10 pages.

Schmidt et al., "Coordination mechanisms: Towards a conceptual foundation of CSCW systems design," Computer Supported Cooperative Work (CSCW) 5, 2 (1996), 50 pages.

Steen, "Co-Design as a Process of Joint Inquiry and Imagination," Design Issues 29, 2 (2013), 19 pages.

Mell et al., "The NIST Definition of Cloud Computing," Recommendations of the National Institute of Standards and Technology, NIST Special Publication 800-145, Sep. 2011, 7 pages.

* cited by examiner

ERROR ANALYSIS OF A PREDICTIVE MODEL

BACKGROUND

The subject disclosure relates to error analysis of a predictive model.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system is provided. The system includes a processor that executes computer-executable components stored in memory. The computer-executable components include an overview component that causes a client device to present first data identifying an error corresponding to a cell of a confusion matrix for a classification model. The error represents a mismatch between a first label generated by the classification model and a second label corresponding to a ground-truth observation. The computer-executable components also include an element view component that receives second data defining a root cause of the error. In addition, the computer-executable instructions include an error annotation component that embeds the second data into a first data structure containing the first data, resulting in a first annotated data structure.

According to another embodiment, a computer-implemented method is provided. The computer-implemented method includes causing, by a computing system operatively coupled to a processor, a client device to present first data identifying an error corresponding to a cell of a confusion matrix for a classification model. The error represents a mismatch between a first label generated by the classification model and a second label corresponding to a ground-truth observation. The computer-implemented method also includes receiving, by the computing system, second data identifying a root cause of the error. In addition, the computer-implemented method includes embedding, by the computing system, the second data into a first data structure containing the first data, resulting in a first annotated data structure.

According to another embodiment, a computer-implemented method is provided. A computer program product for analysis of an error of a classification model. The computer program product includes a computer-readable storage medium having program instructions embodied therewith. The program instructions are executable by a computing system to cause the computing system to cause a client device to present first data identifying an error corresponding to a cell of a confusion matrix for a classification model. The error represents a mismatch between a first label generated by the classification model and a second label corresponding to a ground-truth observation. The program instructions also are executable by the computing system to cause the computing system to receive second data identifying a root cause of the error. The program instructions are further executable by the computing system to cause the computing system to embed the second data into a first data structure containing the first data, resulting in a first annotated data structure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 presents a non-limiting example of a confusion matrix for a classification model, in accordance with one or more embodiments described herein.

FIG. 10 presents a non-limiting example of a user interface that presents information characterizing individual misclassification errors of a defined type, in accordance with one or more embodiments described herein.

DETAILED DESCRIPTION

Embodiments described herein address error analysis of classification models and other types of predictive models. Commonplace approaches to such error analysis typically fail to provide a comprehensive overview of errors resulting from the utilization of a predictive model. Those commonplace approaches also typically fail to provide information that characterizes an individual error resulting from such an application of the predictive model. Further, commonplace approaches fail to permit the annotation of errors with root-cause data.

The embodiments disclosed herein address, among other issues, the foregoing challenges of commonplace technologies. Embodiments can provide a comprehensive, consolidated view of errors resulting from the application of a predictive model to data in a production environment. For purposes of illustrations, the predictive model can be a classification model and, thus, the errors of the predictive model can include misclassification errors. A misclassification error represents a mismatch between a label generated for an element (e.g., a sentence or a clause) by the classification model and a second label corresponding to a ground-truth observation for that element. Accordingly, the misclassification error corresponds to the element, the label and the second label indicate a type of the misclassification error. The embodiments of described herein, however, are not limited in that respect and the principles of this disclosure also can be applied to an automated translation model or another type of model that generates output data as the result of applying the predictive model to a datum or data in the production environment.

The embodiments also can permit selecting a particular error and, in response, can provide detailed information that characterizes that particular error. By providing such information, an error-root cause for a particular error of a predictive model can be determined. Accordingly, embodiments disclosed herein can provide several root-cause labels that can be selected in order to create a record of the error root-cause. After the selection of a root-cause label, embodiments disclosed herein can embed data identifying the error root-cause into a data structure defining the particular error.

Embodiments of the disclosed technologies also can generate a listing of errors that are similar to a particular error selected from a comprehensive consolidated view of errors. The listing of errors can be generated by applying one or several rules to a pool of errors included in the comprehensive consolidated view of errors. The one or several rules can dictate similarity between errors.

Figure 1:
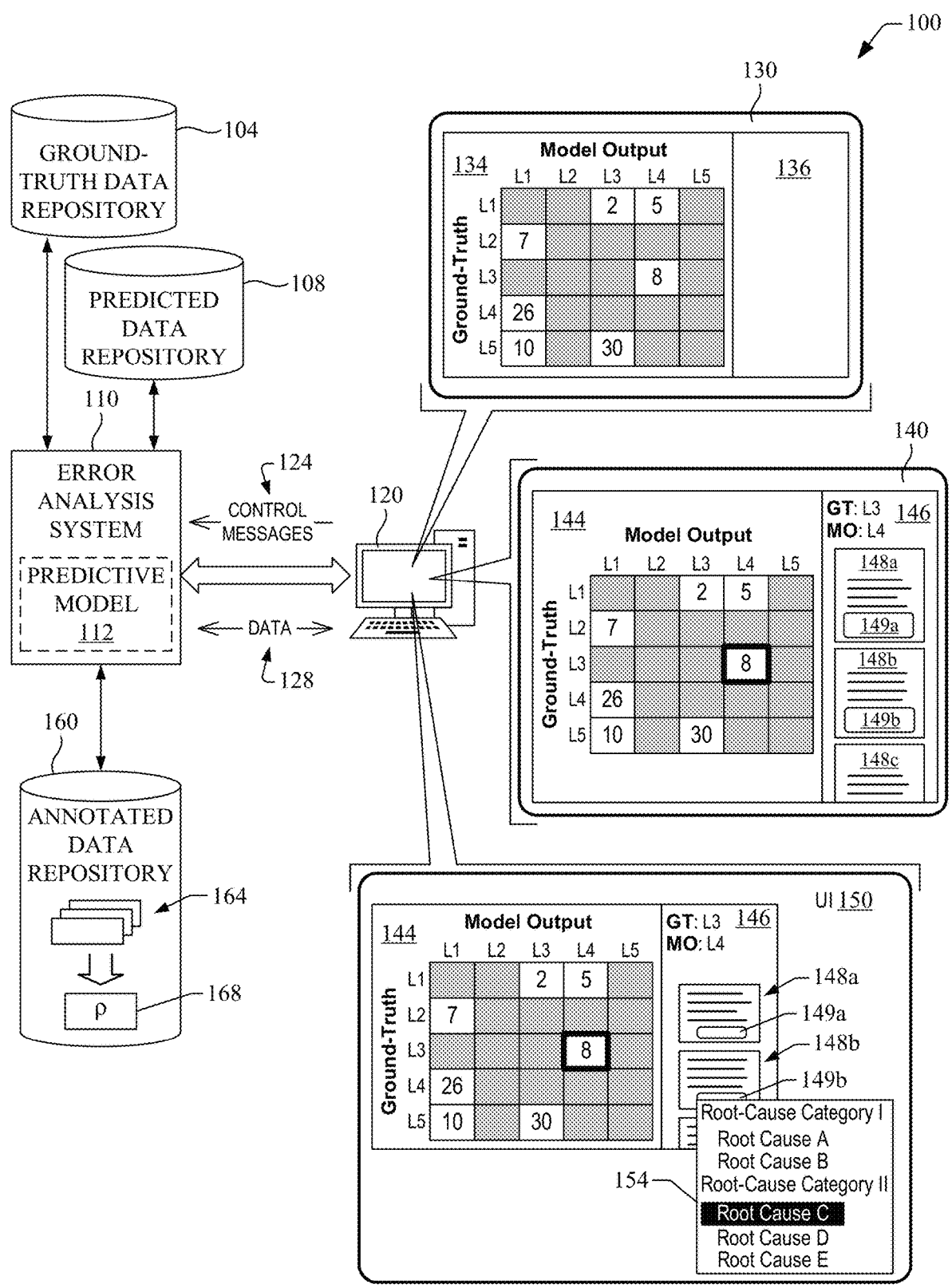
FIG. 1 presents a non-limiting example of an operational environment for analysis of errors of a predictive model, in accordance with one or more embodiments described herein.

With reference to the drawings, FIG. 1 presents a non-limiting example of an operational environment 100 for analysis of errors of a predictive model 112, such as a classification model, in accordance with one or more embodiments described herein. The operational environment 100 includes an error analysis system 110 that can receive various types of data from several source devices, and can permit error analysis of a predictive model 112. In particular, the error analysis system 110 can receive data defining ground-truth observations from one or many memory devices 104 (referred to as ground-truth data repository 104). A ground-truth observation can include, for example, a label generated by a reference device, such as a subject matter expert (SME) device, a reviewer device, or a crowdsource device within a crowdsource platform (e.g., a social media platform). In some embodiments, the reference device can be a ground-truth extraction device that can extract ground-truth observations from existing datasets or resources. In other embodiments, the reference device can be a synthetic ground-truth generation device that can generate both synthetic input elements and respective ground truth observations.

In addition, the error analysis system 110 can receive data indicative of output items generated by the predictive model 112. Such data can be received from one or many memory devices 108 (referred to as predicted data repository 108). An output item can include, for example, a classification label, a classification score, or another type of quantity representing an output of the predictive model 112. In a production environment, the predicted data repository 108 can be populated by multiple devices that utilize the predictive model 112 for a prediction task (e.g., classification of text) on disparate corpuses of data, such as non-fiction literature, novels or other fiction literature, and similar. Data related to the performance of the predictive model 112 and received from a first device of those multiple devices can be referred to as a feedback stream. A feedback stream can include, for example, data resulting from the application of the predictive model 112 and/or other data describing results of the application of the predictive model 112.

The error analysis system 110 can generate a confusion matrix for the predictive model 112 using the data received from the ground-truth data repository 104 and the other data received from the predicted data repository 108. The confusion matrix can summarize the errors of a predictive model 112. A cell of the confusion matrix can be indexed using a composite index $(\lambda, \lambda')$. Here, $\lambda$ can represent a label or another type of ground-truth attribute defined by a SME device. In turn, $\lambda'$ can represent a particular type of model output (e.g., a classification label or a classification score). Cell $c(\lambda, \lambda')$ can thus represent, in one example, the number of text elements (e.g., sentences or clauses within a document) that have been labeled by SME devices as $\lambda$ but have been predicted by the predictive model 112 as $\lambda'$. In one configuration, the indices $\{\lambda\}$ can be conveyed on a first axis of the array (the abscissa, for example) and the indices $\{\lambda'\}$ can be conveyed on a second axis of the array (the ordinate, for example). As such, in an instance in which the predictive model 112 is a classification model, the abscissa can correspond to labels generated using the classification model, and the ordinate can correspond to labels generated by an SME device or another type of ground-truth reference device.

The operational environment 100 also can include a client device 120 that can be functionally coupled with the error analysis system 110. The client device 120 can execute a software application to analyze errors of the predictive model 112 used to generate the predicted data repository 108. In response to execution of the software application, the client device 120 can send a notification message to the error analysis system 110. The notification message can be included within control messages 124, and can indicate that error analysis for the predictive model 112 has been initiated. The error analysis system 110 can receive the notification message and, in response, can send overview data to the client device 120. The overview data can be included in data 128. The overview data can include first data defining the confusion matrix for the predictive model 112. In one embodiment, the confusion matrix is a specific table layout that permits visualization of the performance of a prediction algorithm constituting the predictive model. In addition, or in some embodiments, the overview data can include second data defining formatting attributes for a user interface (UI) to be presented at the client device 120 as a representation of the confusion matrix. For purposes of illustrations, a formatting attribute can include a numerical value or alphanumerical value that identifies a characteristic of a visual element displayed on a user interface. The numerical value or alphanumeric value can thus identify a font type, a font size, a color, a length of a line, thickness of a line, a size of a viewport or bounding box; presence or absence of an overlay; type and size of the overlay, or similar.

Figure 2:
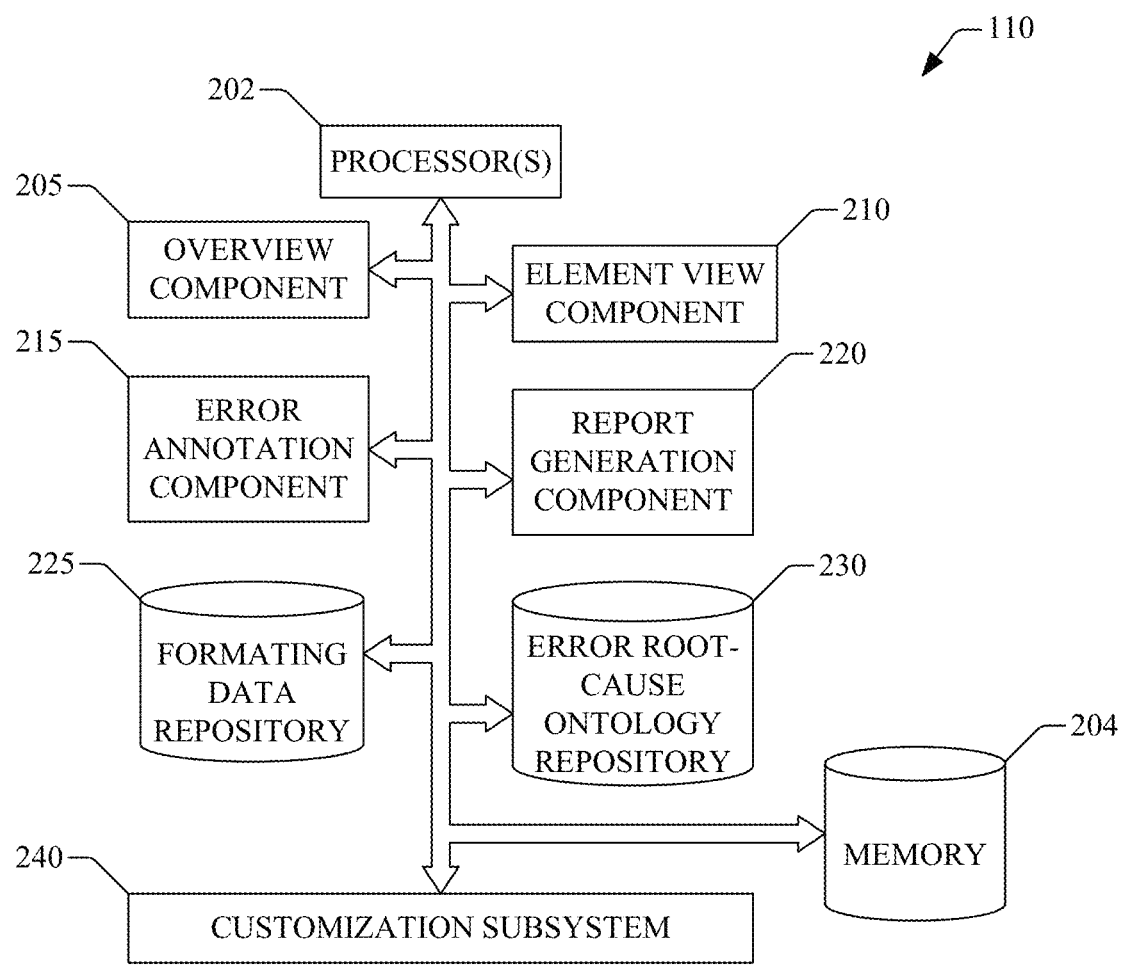
FIG. 2 is a block diagram of a non-limiting example of a system for analysis of errors of a predictive model, in accordance with one or more embodiments described herein.

Accordingly, in some embodiments, as is illustrated in FIG. 2, the error analysis system 110 can include an overview component 205 that can generate the first data defining the confusion matrix. To that end, in one example, the overview component 205 can obtain first labels of respective ground-truth observations from the ground-truth data repository 104. In addition, the overview component 205 can obtain multiple second labels from the predicted data repository 108. Then, the overview component 205 can determine a number of times that both a ground-truth observation corresponds to a label $\lambda$ and that the predictive model predicts a label $\lambda'$. The overview component 205 then assigns that number to a cell of the confusion matrix. The error analysis system 110 also can include one or several memory devices 225 (referred to as formatting data repository 225) containing formatting attributes. The overview component 205 can select a subset of the formatting attributes, and can generate the second data that can be sent to the client device 120. In some embodiments, the overview component 205 can use the first data to select that subset. In one example, a size of the confusion matrix can dictate a font size to be used when displaying numerical values of the confusion matrix. The overview component 205 can thus select a formatting attribute representing that font size. In another example, the number of misclassifications corresponding the $c(\lambda,\lambda')$ can dictate a color to be used when a visual element representing such a cell is displayed by the client device 120. The overview component 205 can then select a formatting attribute representing the color.

A customization subsystem 240 can configure the number and types of the formatting attributes available for selection by the overview component 205. To that end, in one embodiment, the customization subsystem 240 can include a component that can detect a device type of the client device 120, and can then configure a family of fonts or a color palette, or both, to be available. In another embodiment, the customization subsystem 240 can include a component that can configure a formatting attribute (e.g., a parameter or logic variable) that dictates whether to display absolute numerical values on the cells of the confusion matrix or relative values (such as percentage points). In yet another embodiment, the customization subsystem 240 can include a component that can configure one or many formatting attributes that can dictate an order of labels on the axes associated with the confusion matrix. In some cases, such a component also can configure one or many first attribute parameters identifying respective labels to be presented on those axes, and can further configure one or many second attribute parameters identifying respective labels to be excluded from presentation.

Referring back to FIG. 1, receipt of the overview data from the error analysis system 110 can cause the client device 120 to present a user interface 130 (UI 130) via a display device. The display device can be integrated into the client device 120 or can be functionally coupled to the client device 120. The user interface 130 can include a first pane 134 and a second pane 136. The first pane 134 can include an array of selectable visual elements representing at least a portion of the confusion matrix. Each selectable visual element in the array represents a cell in the confusion matrix. As mentioned, the cell can be indexed using a composite index ($\lambda$, $\lambda'$), where $\lambda$ can represent a label defined by a reference device (a SME device, for example) and $\lambda'$ can represent a particular type of model output. In one configuration, the indices $\{\lambda\}$ can be conveyed on the abscissa and the indices $\{\lambda'\}$ can be conveyed on the ordinate of the array. As such, in an instance in which the predictive model 112 is a classification model, the abscissa can correspond to labels generated using the classification model, and the ordinate can correspond to labels generated by one or many SME devices.

A first selectable visual element in the array can include a numeric value indicating a number of elements that have been misclassified, for example. An element (e.g., a sentence or a clause in a document) is said to be misclassified when the predictive model 112 is applied to the element and yields a classification label that differs from a ground-truth observation for the element. Formatting attributes of the first selectable visual element can be determined by formatting data received from the error analysis system 110. The formatting data can be received as part of the data 128. In addition, a second selectable visual element in the array can represent a cell where model output is in agreement with ground-truth observation; e.g., misclassification has not occurred. Thus, the numeric value corresponding to the second selectable visual element is zero for cases in which misclassification has not occurred and therefore the model output is consistent with ground-truth observation. As such, in some embodiments, the second selectable visual element can be unmarked when the numerical value is zero. As is illustrated in FIG. 1, in one example, unmarked visual elements in the array can have a defined shade of gray or other color. One or several formatting attributes, including color, of an unmarked visual element can be defined by the second data included in the overview data received from the error analysis system 110. Accordingly, the array of selectable visual elements that represents the confusion matrix can provide a comprehensive, consolidated overview of model performance relative to ground-truth observations across multiple feedback streams.

The second pane 136 in the user interface 130 can lack markings unless a particular cell within the confusion matrix shown in the pane 134 is selected. The particular cell can be selected by selecting a selectable visual element in the array representing the confusion matrix. Such a selection can cause the client device 120 to send a selection message, for example, to the error analysis system 110. The selection message can be included within the control messages 124, and can include payload data identifying the particular cell that has been selected, e.g., c(L3, L4). The error analysis system 110 can receive the selection message and, in response, can send error data indicative of the errors corresponding to the particular cell. Those errors exhibit the same type of misclassification and result from applying the predictive model 112 to eight different elements (sentences or clauses, of a combination of those). Thus, in one instance, selection of the cell c(L3, L4) in the user interface 130 can result in the error analysis system 110 sending error data indicative of eight misclassification errors corresponding to the model output being label L4 and the ground-truth classification being label L3. In some instances, the error analysis system 110 also can send formatting data. It is noted that reference to eight different elements and related errors is made simply for illustrations purposed, and the disclosure is not limited in that respect.

In some embodiments, as is illustrated in FIG. 2, the error analysis system 110 can include one or many processors 202; multiple components; and data repositories, including one or many memory devices 204 (referred to as memory 204). The one or many processors, the multiple components, and the data repositories can be electrically, optically and/or communicatively coupled to one another. More concretely, in those embodiments, the error analysis system 110 can include an element view component 210 that can receive the selection message. Using the type of misclassification error, the element view component 210 can obtain the error data from the predicted data repository 108, the ground truth data repository 104, another type of data source, or a combination thereof. In one example, the element view component 210 can obtain general information about the error. The general information can include, for example, content of an element corresponding to the error. In some classification tasks, the content of that element can include text of a sentence or a clause within a document, in some cases. In other classification tasks, the content of that element can include an image or a video segment. In yet other classification tasks, the content of that element can include a name of a song and audio data defining the song, or a keyword or key-phrase (e.g., "Hey friend!") corresponding to an utterance and audio data defining the utterance.

With further reference to FIG. 1, the selection of a particular cell in the UI 130 can cause the client device 120 to present a user interface 140 (UI 140). For instance, receiving the error data from the element view component 210 (FIG. 2) can cause the client device 120 to present the user interface 140. As is illustrated in FIG. 1, the user interface 140 can include a first pane 144 and a second pane 146. The first pane 144 can include an array of selectable visual elements representing the confusion matrix. In some instances, a first selectable visual element representing the particular cell can be formatted to indicate that the particular cell has been selected. In one example, a bounding box of the particular cell can have a thicker line than respective bounding boxes of other cells in the array. Here, the bounding box refers to a boundary that confines the particular to a portion of the user interface 140. Other formats, such as an overlay and/or specific colors, also can be implemented.

Rather than being blank (as is the case in pane 136 at UI 130), the pane 146 in the UI 140 can be populated with multiple indicia representing the errors corresponding to the particular cell that has been selected, e.g., c(L3, L4). The client device 120 can use the error data and, in some instances, formatting data received from the error analysis system 110 (via the element view component 210 (FIG. 2), for example) to draw contents of the pane 146. Thus, as an example, the pane 146 can include first indicia 148*a* representing a first error, second indicia 148*b* representing a second error, and third indicia 148*c* representing a third error. Other indicia representing other errors can be revealed by interacting with the pane 148. An interaction with the pane 148 can cause the client device 120 to redraw the pane 146 to reveal the other indicia.

The indicia that represent an error listed in the pane 146 also can include a selectable visual element that can permit assigning an error root-cause to the error. For instance, such a selectable visual element is represented by selectable visual element 149*a* within the first indicia 148*a* and by selectable visual element 149*b* within the second indicia 149*b*. The selectable visual element that can permit assigning an error root-cause to the error corresponding to the third indicia 148*c* is not depicted in FIG. 1.

Figure 3A:
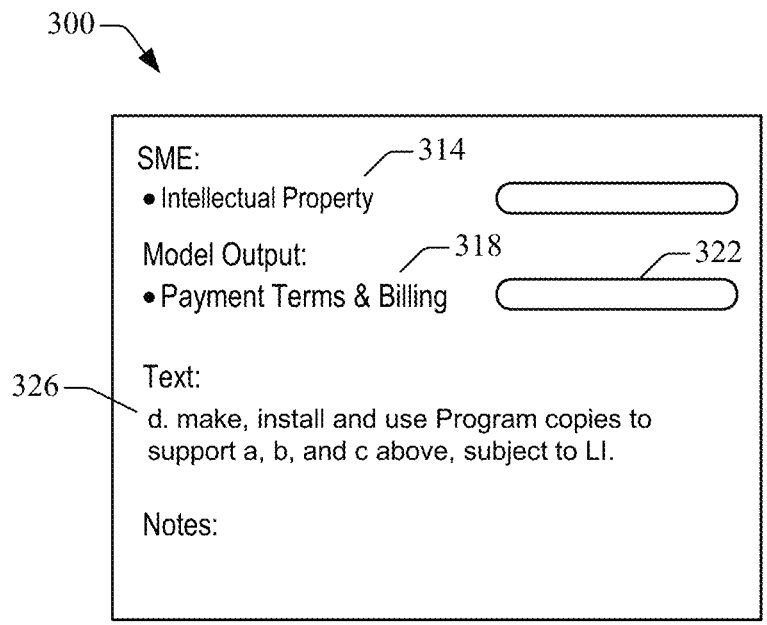
FIG. 3A presents a non-limiting example of a user interface that permits analysis of an error of a classification model, in accordance with one or more embodiments described herein.

Because the error data that can be received from the error analysis system 110 can include general information about an error, the indicia representing the error constitute a user interface that can permit both analyzing the error and assigning an error root-cause to the error. As an illustration, FIG. 3A presents a non-limiting example of a user interface 300 (UI 300) formed by indicia representing an error of a classification model that predicts labels for textual elements within documents. The textual elements can include sentences and clauses, for example. The user interface 300 can thus represent a misclassification error, providing general information about that error. To that end, the user interface 300 can include a first string of characters 314 identifying a label produced by a SME device for a textual element of a document. The user interface 300 also includes a second string of characters 318 identifying a label generated by the classification model for the textual element. Simply as an example, the label represented by the first string of characters 314 is "Intellectual Property," and the label represented by the second string of characters 318 is "Payment Terms & Billing." The user interface 300 further includes a third string of characters 326 identifying the textual element. The user interface 300 also includes a selectable visual element 322 that can permit assigning an error root-cause to the error represented by the user interface 300.

Figure 3B:
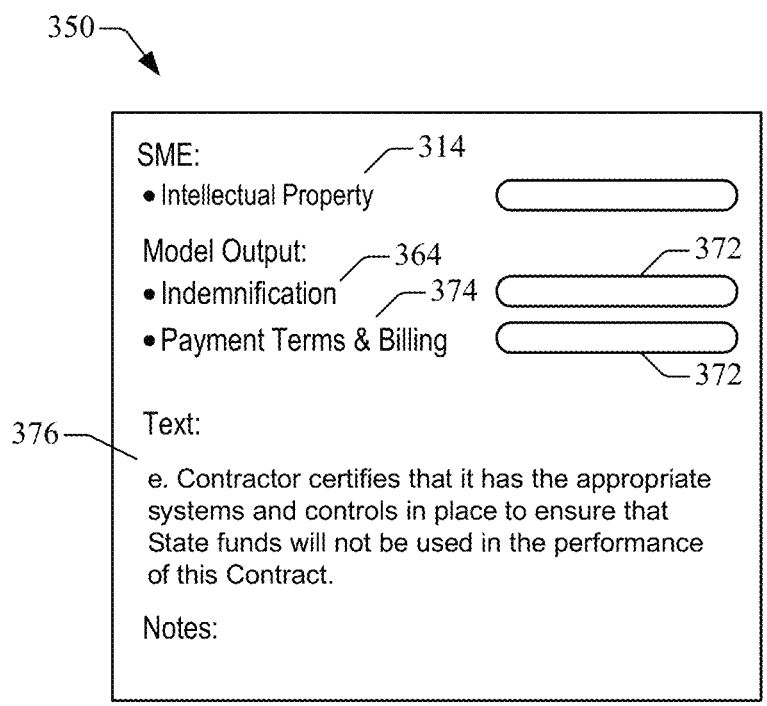
FIG. 3B presents a non-limiting example of another user interface that permits analysis of an error of a classification model, in accordance with one or more embodiments described herein.

In some instance, the classification model can predict multiple labels for a particular element (e.g., a sentence). FIG. 3B presents a non-limiting example of a user interface 350 (UI 350) formed by indicia representing an error of the classification model that can predict multiple labels for textual elements within documents. The user interface 350 can thus represent a misclassification error, providing general information about that error. The user interface 350 also can include the first string of characters 314. The user interface 350 also includes a second string of characters 364 identifying a first label generated by the classification model for the textual element. In addition, the user interface 300 includes a third string of characters 374 identifying a second label generated by the classification model for the textual element. The user interface 300 further includes a third string of characters 375 identifying the textual element. The user interface 300 also includes selectable visual elements 372 that can permit assigning an error root-cause to each of the first label and second label.

Referring back to FIG. 1, selection of a selectable visual element such as 149*a* or 149*b* can cause the client device 120 to send an error notification message to the error analysis system 110. The error notification message can be included within the control messages 124, and can include payload data identifying the error. In response to receiving the error notification message, the error analysis system 110 can send root-cause data to the client device 120. The root-cause data can be part of the data 128, and can include first data defining categories of error root-causes. Those categories can include, for example, model errors, labeling/feedback errors, and errors of preceding models. Each one of the categories includes one or many error root-causes. The root-cause data also can include second data defining groups of error-root causes, each group pertaining to a category of error root-causes.

In some embodiments, as is illustrated in FIG. 2, the error analysis system 110 can include an error annotation component 215 that can obtain the root-cause data from one or several memory devices 230 (referred to as error-root cause ontology repository 230). The error annotation component 215 can then send the error data to the client device 120. Root-causes available within the error root-cause ontology repository 230 can be configured in numerous ways. To that end, the customization subsystem 240 can generate an ontology of error root-causes and can then retain the ontology within the error root-cause ontology repository 230. In one example, the customization subsystem 240 can supply a fixed predefined ontology of error root causes. In another example, the customization subsystem 240 can monitor the addition of root cause to an extant ontology. Such a monitoring can be accomplished by analyzing data defining error root-causes that can be received from one or more application programming interfaces (APIs) that permit adding new root causes to the extant ontology as the error analysis system 110 is utilized, for example. In yet another example, the customization subsystem 240 can learn error root-causes in an unsupervised fashion as the error analysis system 110 is utilized.

In some embodiments, the customization subsystem 240 can include a recommendation component that determines an error root-cause based on previous user annotations and/or external knowledge. The recommendation component can automatically retain and make available the determined error root-cause to the error annotation component 215. In addition, or in other embodiments, the customization subsystem 240 can include a collaborative component, that allows multiple user devices to supply (via an API, for example) root causes in parallel. The customization subsystem 240 can then identify potential disagreements that may arise due to multi-user annotations. The customization subsystem 240 can permit reconciling differing root causes, and can retain reconciled root causes within the error root-cause ontology.

With further reference to FIG. 1, selection of the selectable visual element also can cause the client device 120 to present a user interface that includes a listing of error root-causes. For instance, selection of the selectable visual element 149b can cause the client device 120 to present a user interface 150 (UI 150) that includes the first pane 144, the second pane 146, and a menu 154 of error root-causes. The menu 154 can be a drop-down menu and can be presented as an overlay on the pane 146, as is shown in FIG. 1, for example.

The items within the menu 154 can be arranged according to the categories of error-root causes defined in the root-cause data received from the error analysis system 110. As an example, the menu 154 can include a first category and a second category. Simply for the sake of nomenclature, the first category is denoted by "Root-Cause Category I" and the second category is denoted by "Root-Cause Category II."

The first category can include a first error root-cause and a second error root-cause. The first and second error root-causes are denoted by "Root Cause A" and "Root Cause B," respectively. The second category can include a first error root-cause, a second error root-cause, and a third error root-cause. The first, second, and third error root-causes are denoted by "Root Cause C," "Root Cause D," and "Root Cause E," respectively.

Selection of an item of the menu 154 can cause the client device 120 to redraw the menu 154 to show the selection. As is illustrated in FIG. 1, Root Cause C has been selected and the selection is represented with a visual element having a dark background and text in white font, whereas prior to the selection the Root Cause C may have been represented by a visual element having light background and text in dark font. Other formats to show the selection of the item also can be implemented. Those other formats can include, for example, an overlay, a color, a particular font type, a particular font size, a combination thereof, or similar.

Figure 4:
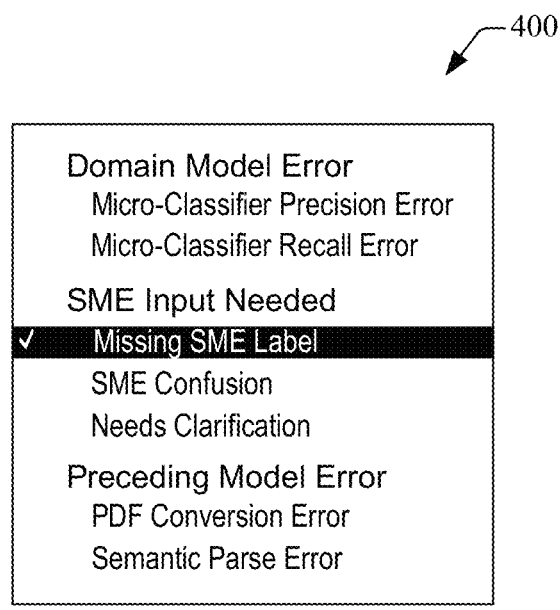
FIG. 4 presents a non-limiting example of a menu of error-root causes that can be used to annotate an error of a classification model, in accordance with one or more embodiments described herein.

FIG. 4 depicts a non-limiting example of a menu 400 of error-root causes that can be used to annotate an error of a classification model, in accordance with one or more embodiments described herein. The error root-causes can be defined in an ontology retained in the error root-cause ontology repository 230 (FIG. 2). The menu 400 can embody menu 154 (FIG. 1) and can include three categories of error root-causes: Domain Model Error, SME Input Needed, and Preceding Model Error. Each of those categories includes a number of error root-causes that can be individually selected. Specifically, the Domain Model Error can include two error root-causes: "Micro-classifier Precision Error" and "Micro-classifier Recall Error." The SME Input Needed can include three error root-causes: "Missing SME Label," "SME Confusion," and "Needs Clarification." The "Missing SME Label" is represented with indicia that conveys selection of that error-root cause. The Preceding Model Error can include three error root-causes: "PDF Conversion Error," and "Semantic Parse Error."

Because the menu 154 (FIG. 1) is presented in response to selection of the selectable visual element 149b, the selection of the item defines an error root-cause (e.g., Root Cause C) for the error represented by the indicia 148b, for example. Selection of the item also can cause the client device 120 to send data defining a selected error root-cause (e.g., Root Cause C) to the error analysis system 110.

The error analysis system 110 can receive the data defining the selected error root-cause. Such data is denoted by p in FIG. 1, simply for the sake of nomenclature. In response, the error analysis system 110 can embed the data into a data structure containing other data identifying the error represented by the indicia 148b. Such data structure can be retained in one or more memory devices 160 (referred to as annotated data repository 160) within a group of data structures 164 containing data identifying respective errors. As a result, the error analysis system 110 can generate an annotated data structure 168. The error analysis system 110 can retain the annotated data structure 168 in the annotated data repository 160. In some embodiments, the error annotation component 215 (FIG. 2) can embed the data defining the selected error root-cause into the data structure, thus generating the annotated data structure 168.

The error analysis system 110 also can generate a report of annotated errors using data retained in the annotated data 160. To that end, in some embodiments, as is illustrated in FIG. 2, the error analysis system 110 can include a report generation component 220. In some embodiments, the report generation component 220 can update a report to include a first annotated data structure or a second annotated data structure, or both. Updating the report can include, in some instances, composing the report to include the first annotated data structure or the second annotated data structure, or both. In addition, or in other instances, updating the report can include modifying the report after the report has been composed, to include the first annotated data structure or the second annotated data structure, or both. By incorporating annotated structures to a report, the report generation component 220 can provide a list of error instances and their respective root causes. In other embodiments, the report generation component 220 can aggregate statistics showing how many errors exhibit a particular root cause. Such statistics can provide a data view of the most common (or second most common or third most common, or the like) root causes.

In some embodiments, a report generated by the report generation component 220 can be a file that can be consumed by a particular application executed in the client device 120. The file can represent a spreadsheet, a set of visual slides, or another type of document. The file can be static or can be editable. In other embodiments, the report generation component 220 can embody or can include a host server that can provide an interactive report, such as an interactive website, that can permit generating various types of views of the data generated by the report generation component 220. Such views can include aggregated views or more discrete type of views (e.g., a view including data corresponding to a particular type of error).

Figure 5:
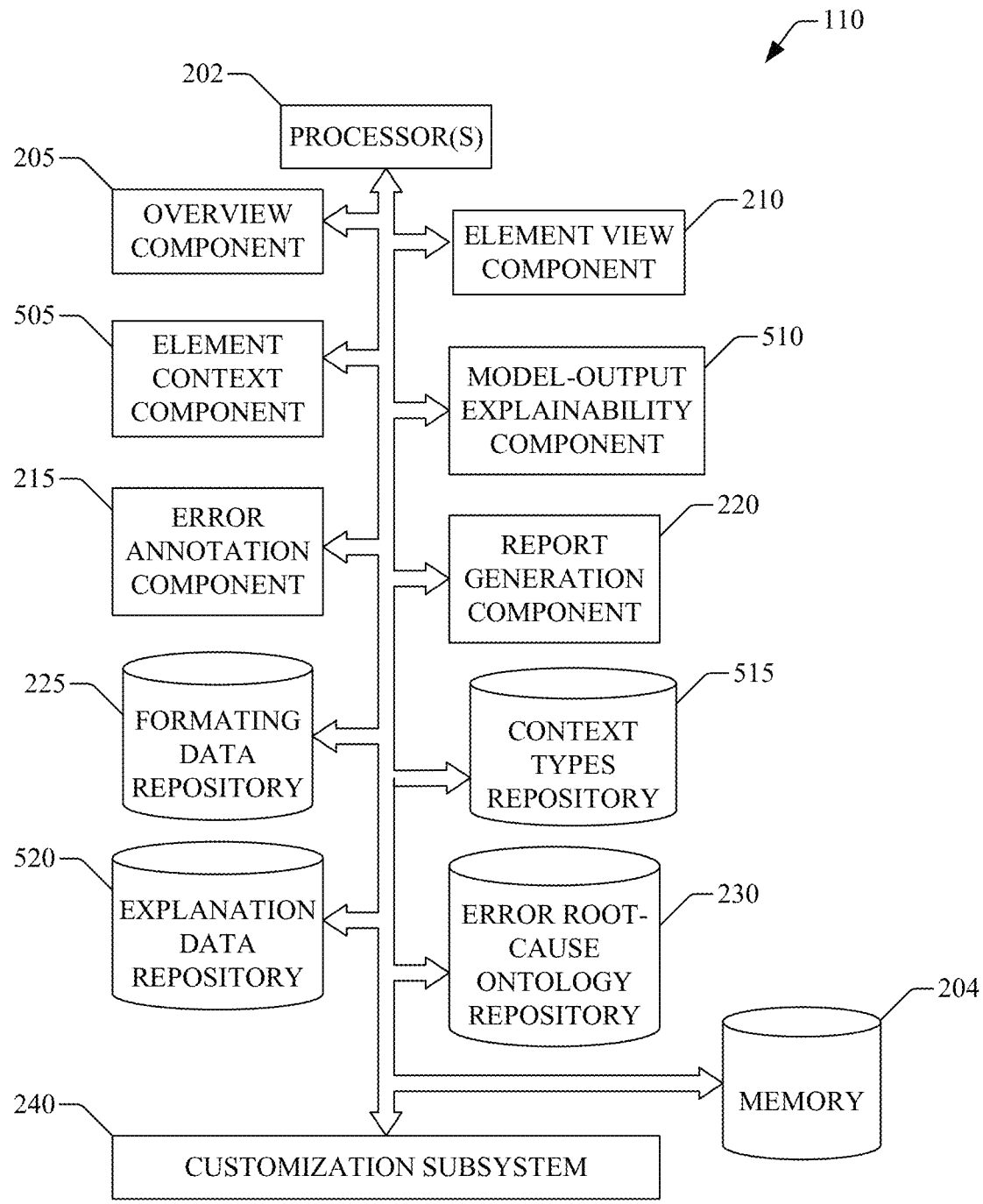
FIG. 5 is a block diagram of a non-limiting example of another system for analysis of errors of a predictive model, in accordance with one or more embodiments described herein.

In some instances, general information about an error may be insufficient to determine a root cause of the error. Thus, in some embodiments, as is illustrated in FIG. 5, the error analysis system 110 can provide other functionality that permits assigning an error root-cause to an error.

Figure 6:
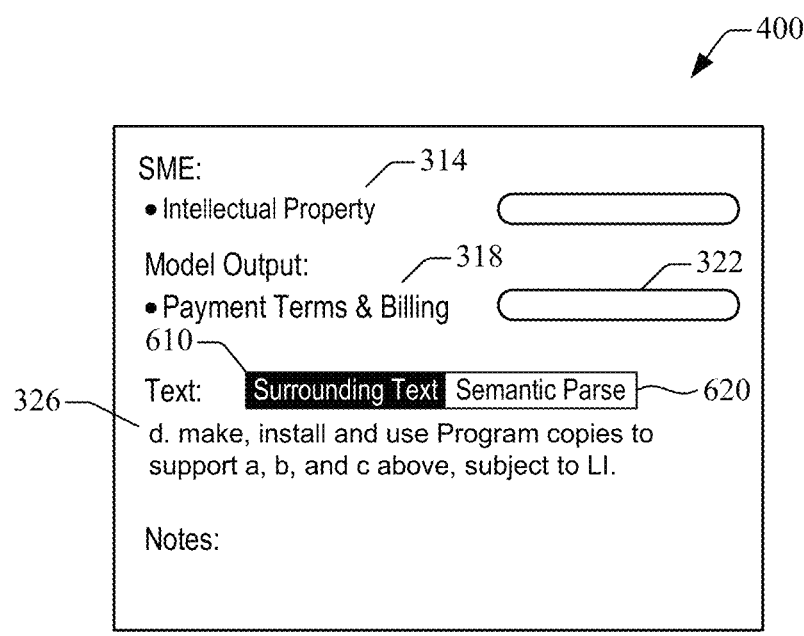
FIG. 6 presents a non-limiting example of a user interface that permits analysis of an error of a classification model, in accordance with one or more embodiments described herein.

In those embodiments, the indicia that represents an error (e.g., indicia 148a, indicia 148b, or indicia 148c) can constitute a user interface 600 as is illustrated in FIG. 6. The user interface 600 can include the general information conveyed by the first string of characters 314, the second string of characters 318, and the third string of characters 326. The user interface 600 also can include a first selectable visual element 610 and a second visual element 620 that, in response to being individually selected, can cause the client device 120 (FIG. 1) to present additional information that can permit further analyzing the error. For example, selection of the first selectable visual element 610 can cause the client device 120 (FIG. 1) to present first type of content representing contextual information about the error. In addition, selection of the selectable visual element 620 can cause the client device 120 to present second type of content representing other contextual information about the error. The contextual information can include, for example, data defining knowledge to infer a correct classification for the textual element corresponding to the error. To present the contextual information, the client device 120 can send a request message to the error analysis system 110 in response to selection of the selectable visual element 610 or the selectable visual element 620. The request message can include payload data identifying the textual element corresponding to the error—e.g., the text identified by the third string of characters 326. The element context component 505 (FIG. 5) included in the error analysis system 110 can receive the request message and, in response, can select text surrounding the textual element within a source document. The element context component 505 can then send data defining the selected text to the client device 120 (FIG. 1). In some instances, the element context component 505 also can send formatting data that can dictate a format for presentation of the selected text.

The type of context information to be supplied by the element context component 505 can be retained in one or more memory devices 515 (referred to as context types repository 515). The context types repository 515 can contain, in some embodiments, a name of different types of contextual information and/or retrieval information defining how to retrieve each type of contextual information. The retrieval information can define a URL to external resources or a group of APIs that can provide contextual information. In one example, a first context type retained in the context types repository 515 can include an amount of text surrounding the textual element corresponding to the error. In addition, or in another example, a second context type can include an output (or, in some cases, several outputs) of one or several preceding models on the current element. The output of a preceding model can constitute input the predictive model 112. In some cases, the context types repository 515 also can include formatting attributes that can dictate the manner of presenting information corresponding to one or many context types.

Figure 7:
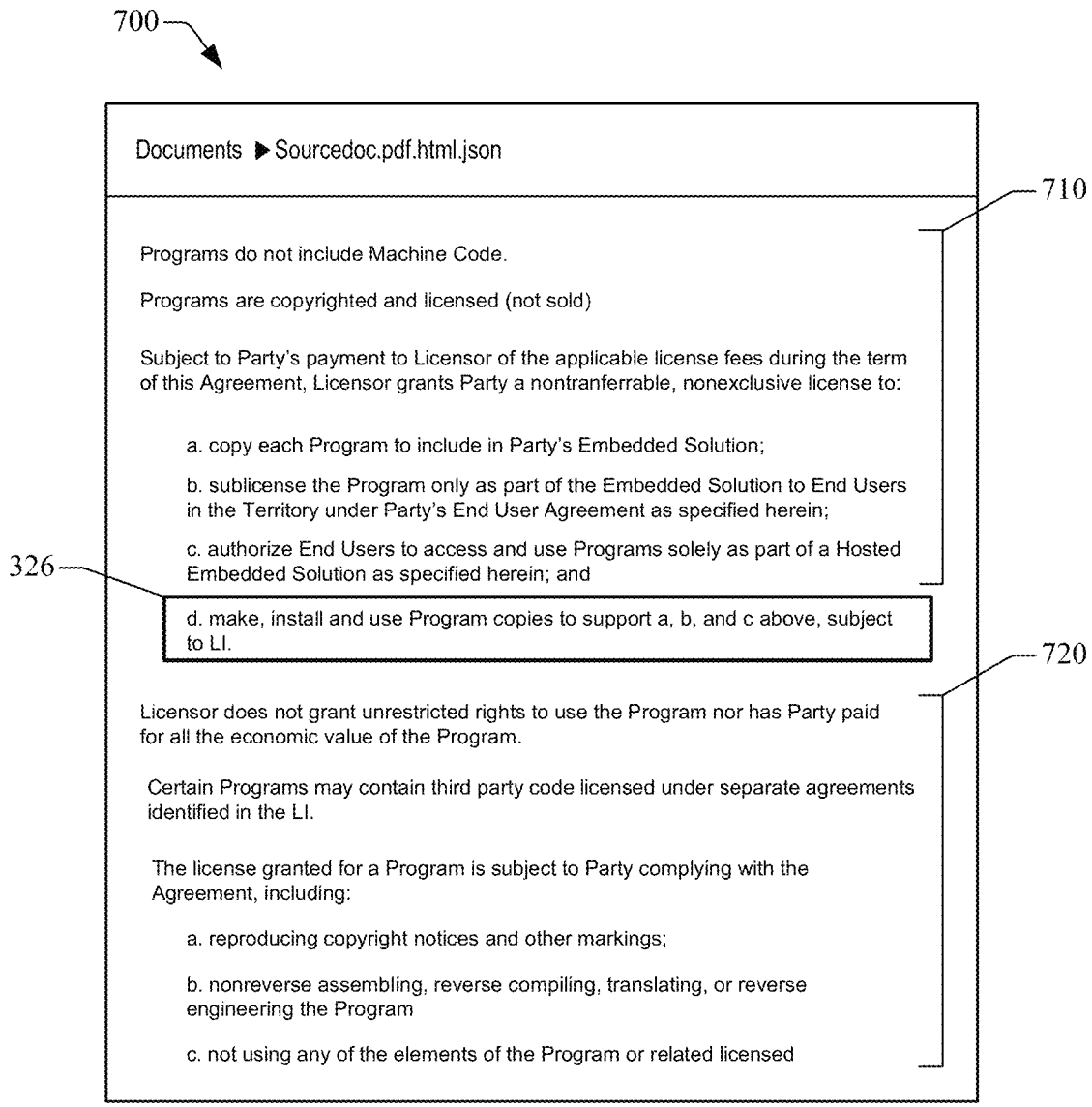
FIG. 7 presents a non-limiting example of a user interface that provides context information corresponding to an error of a classification model, in accordance with one or more embodiments described herein.

As an illustration, selection of the first selectable visual element 610 (FIG. 6) can cause the client device 120 (FIG. 1) to present a user interface 700 as is shown in FIG. 7. As mentioned, the user interface 700 can include first textual elements 710 and second textual elements 720 surrounding a particular textual element identified by the indicia 326 (FIG. 3A and FIG. 6). In the user interface 700, that particular textual element is marked with an open rectangle. Other marking can be utilized. In addition, or in some embodiments, selection of a second selectable visual element 620 (FIG. 6) can cause the client device 120 to present the output of a semantic parser (on top of which the current classification model is built) on the current element represented by the third string of characters 326.

As is illustrated in FIG. 5, in some embodiments, the error analysis system 110 also can include a model-output explainability component 510 that can provide an explanation of how a classification model yielded an error. The explanation can include at least one of a decision tree, a rule, a logic program, a group of examples semantically similar to the current element, or group of attention weights on the features that contributed to yielding a classification corresponding to the error. Such features can include, for example, manual features obtained by feature engineering, lexical features (such as words, tokens, n-grams, or a combination thereof), or latent features learned by the classification model. In those embodiments, the customization subsystem 240 can configure the model-output explainability component 510 to provide explanations according to a particular explainability approach. To that end, the customization subsystem 240 can include a component that can select the explainability approach based on the type of the underlying predictive model utilized to for predictive tasks that result in the data contained in the predicted data repository 108 (FIG. 1).

As an example, for a logic program-based model, the explainability approach can include presenting the part of a logic program responsible for the prediction. As another example, for an opaque deep learning model, the explainability approach can include a model that relies on local interpretable model agnostic explanations (LIME). As yet another example, the explainability approach can include presenting examples that are semantically similar to a current element. Those examples can be identified by using neighbor-based explainability approaches, for example. In some embodiments, as is illustrated in FIG. 5, one or more memory devices 520 (referred to as explanation data repository 520) can retain data defining a group of explainability approaches. Such data can include different types of information. In one example, the data can include the name of each explainability approach. In addition, or in another example, the data can include information on how to invoke an explainability approach in case the explainability approach constitute external resources. Further, or in yet another example, the data can include information on how to visualize results generates using an explainability approach. The results can be presented using text visualizations, histograms, and similar.

Figure 8:
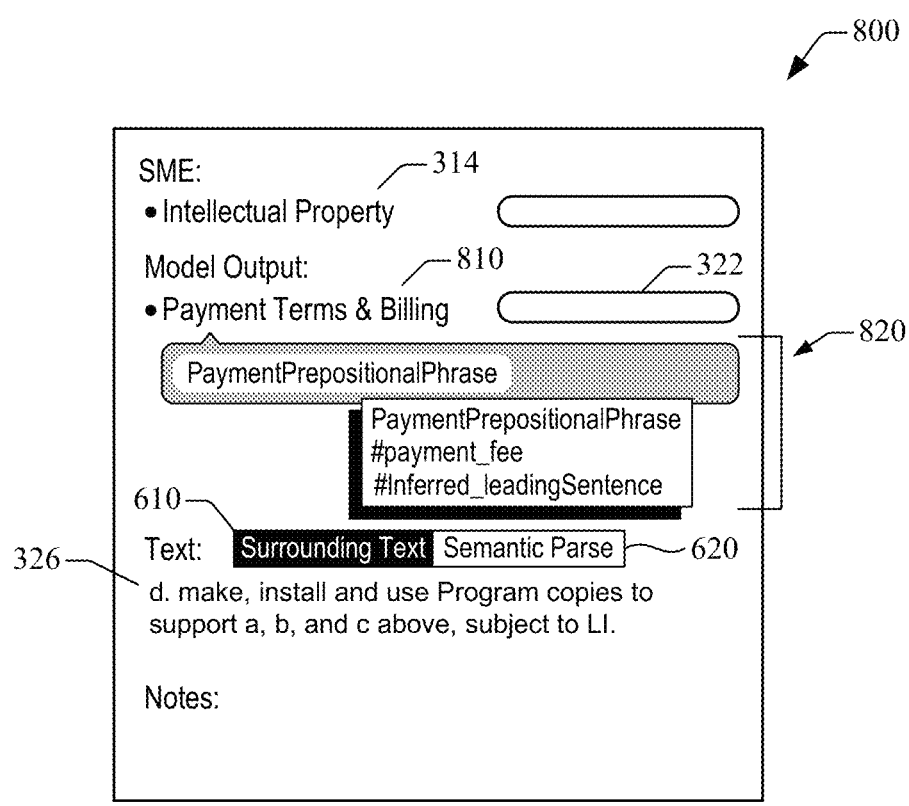
FIG. 8 presents a non-limiting example of a user interface for analysis of errors of a classification model, in accordance with one or more embodiments described herein.

Accordingly, in some embodiments, the indicia representing the error of the classification model also can include a selectable visual element that, in response to being selected, can cause the client device 120 (FIG. 1) to present an explanation of how the classification model yielded the error. An example of that user interface is the user interface 800 shown in FIG. 8. The user interface 800 includes the first string of characters 314 and the third string of characters 326. The user interface 800 also includes a selectable visual element 810 that identifies a label generated by the classification model for a textual element of a document. The label is denoted by "Payment Terms & Billing," as an example.

Selection of the selectable visual element 810 can cause the client device 120 (FIG. 1) to present an explanation 820 of how the classification model yielded the error. To that end, the client device 120 (FIG. 1) can send a request message to the error analysis system 110, in response to selection of the selectable visual element 810. The request message can be included in the control messages 124 (FIG. 1). The request message can include payload data identifying the label ("Payment Terms & Billing" in UI 500) output by the classification model. The model-output explainability component 510 that can be included in the error analysis system 110 (FIG. 5) can receive the request message. In response, the model-output explainability component 510 can identify a portion of the classification model that yielded the label. In addition, the model-output explainability component 510 also can identify one or several attention weights for that portion of the classification model. The model-output explainability component 510 can then send explanation data defining that portion of the classification model or the attention weight(s), or both, to the client device 120 (FIG. 1). The explanation data can be sent as part of the data 128 (FIG. 1). In some instances, the model-output explainability component 510 also can send formatting data that can dictate a format for presentation of the explanation data.

Figure 9:
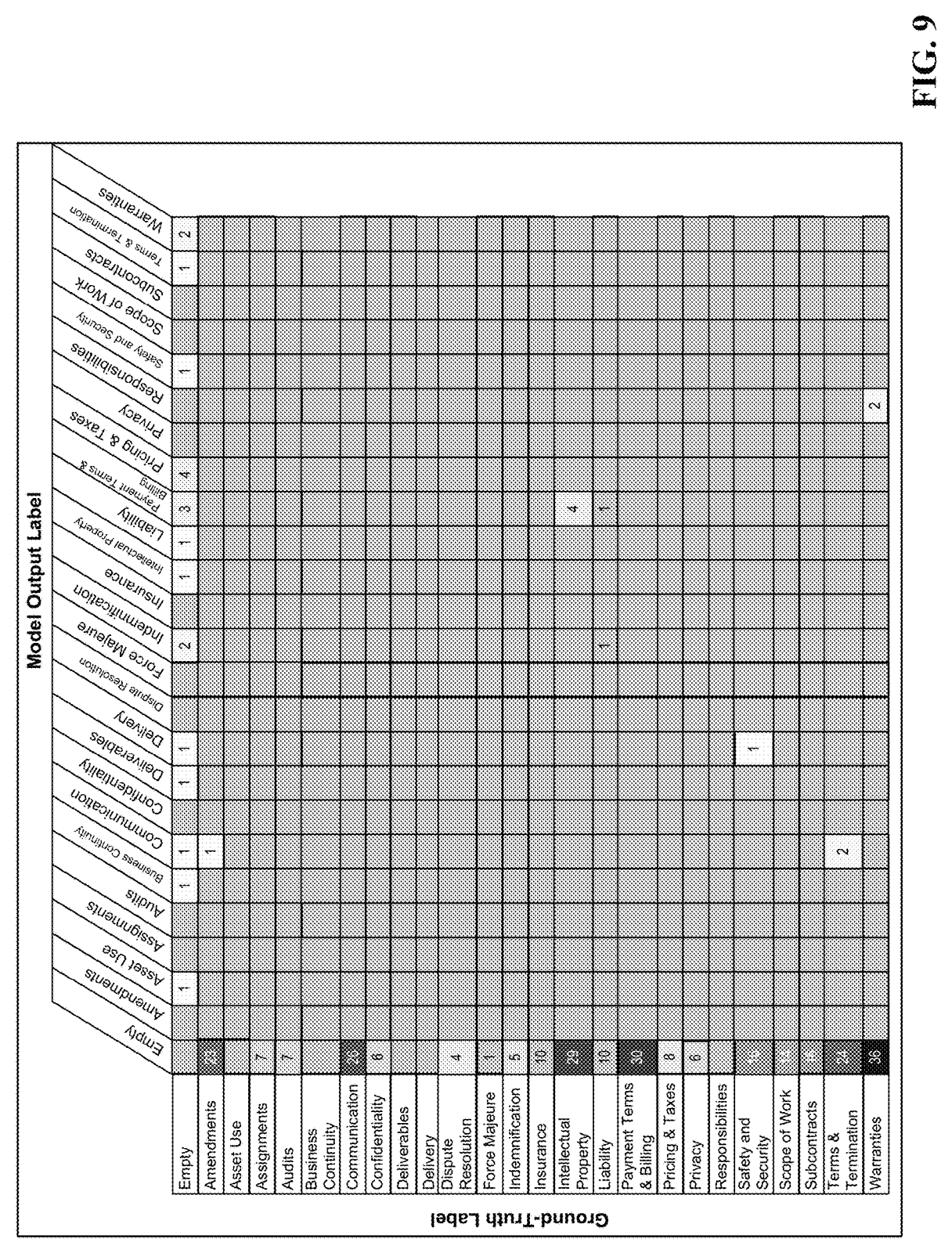

Embodiments disclosed herein are not limited to a small set of labels or other attributes indicative of respective predictions. FIG. 9 presents a non-limiting example of a confusion matrix for a classification model, in accordance with one or more embodiments described herein. The confusion matrix originates from data within the predicted data repository 108 based on 25 different labels. Accordingly, the embodiments described herein can permit error analysis of complex, rich prediction tasks. As mentioned, the error analysis system 110 can provide formatting data that define format attributes of the presentation of the confusion matrix. As is shown in FIG. 9, cells of the confusion matrix can be color-coded according to the magnitude of the number of elements corresponding to a defined type of error. Thus, the error overview provided by the confusion matrix shown in FIG. 9 can readily permit the identification of types of errors that are prevalent in a particular predictive model.

Figure 10:
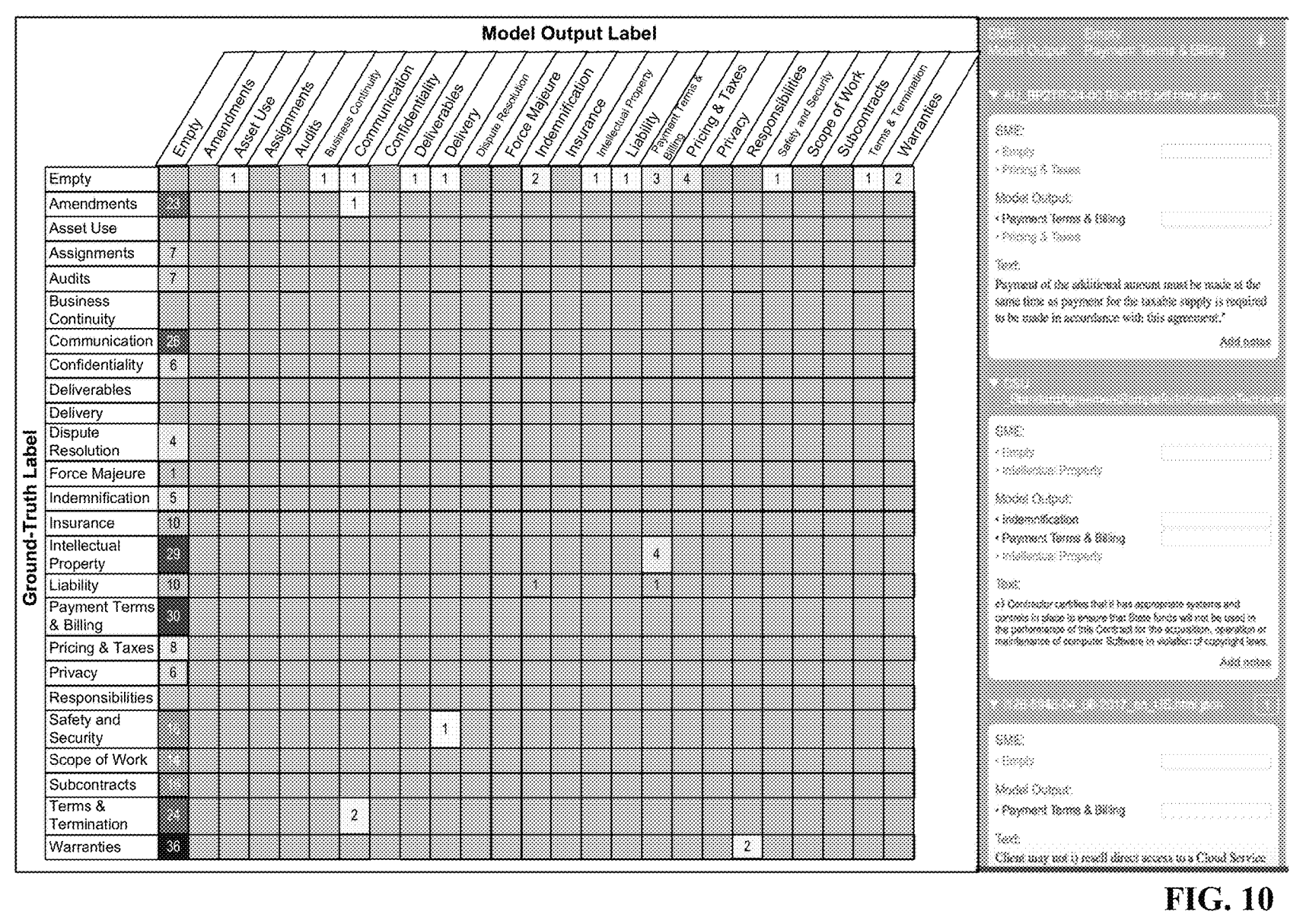

FIG. 10 presents a non-limiting example of a user interface that presents information characterizing individual misclassification errors of a defined type, in accordance with one or more embodiments described herein.

After a record of an error root-cause has been generated for an error exhibiting a defined type of misclassification, the client device 120 can modify the indicia that represents the error within the pane 146 (FIG. 1) in order to incorporate a visual element identifying the error root-cause. In some embodiments, the selectable visual element that causes the presentation of a menu of root causes and is included in such indicia can be marked with a string of characters identifying the error root-cause. For example, the string of characters can be "Missing SME Label," representing an error root-cause within the "SME Input Needed" category shown in FIG. 4.

Figure 11:
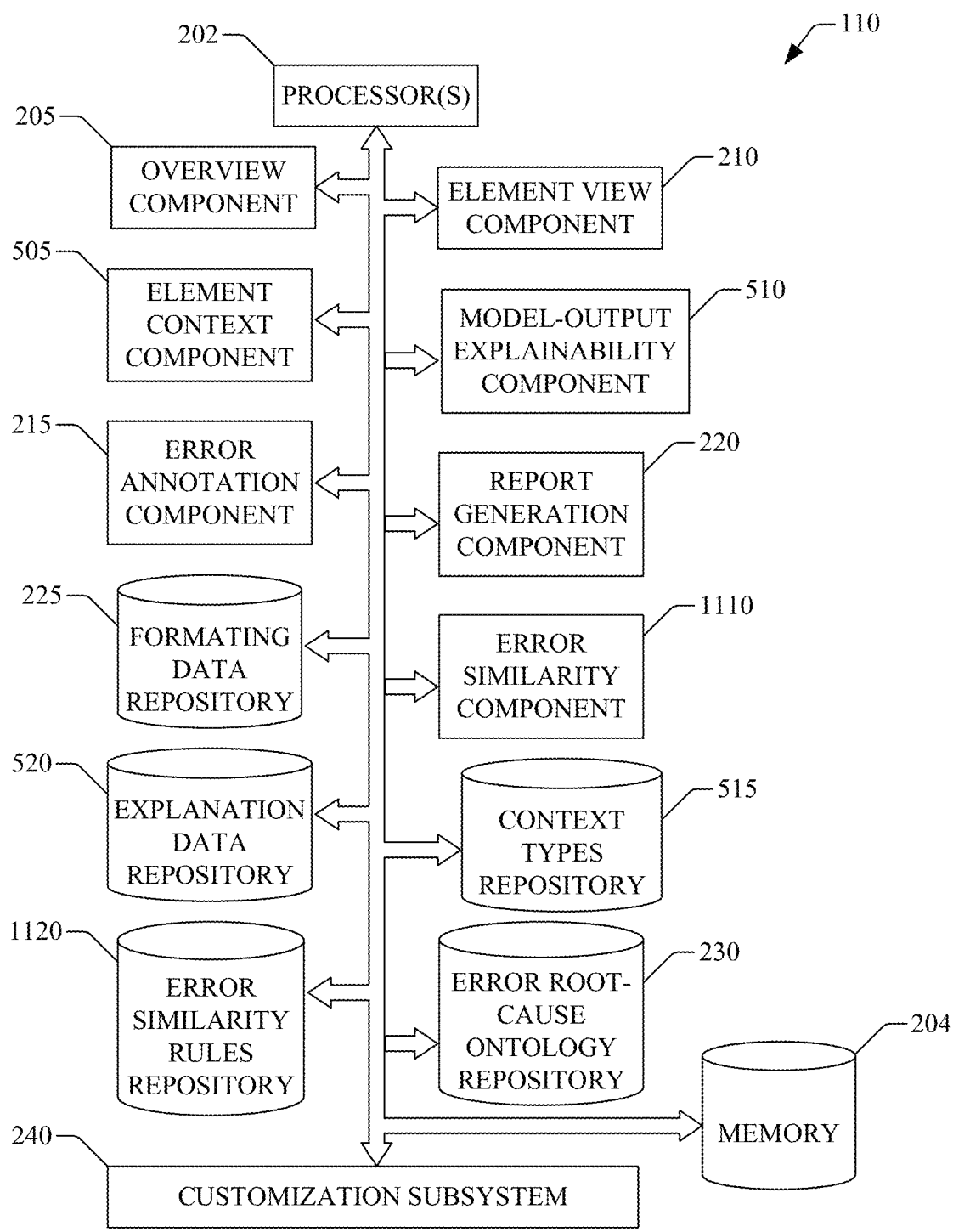
FIG. 11 is a block diagram of a non-limiting example of a system for analysis of errors of a predictive model, in accordance with one or more embodiments described herein.

In some embodiments, the error analysis system 110 can provide additional functionality in response to the generation of the record of the error root-cause. Such functionality can be made available by means of the user interface formed by the indicia that represents the error. An example of the additional functionality includes identification of a group of errors, each error being similar to a defined error of a classification model. As is illustrated in FIG. 11, the error analysis system 110 can include an error similarity component 1110 that can identify a first error that is similar to a second error. To that end, in some embodiments, the error similarity component 1110 can apply one or several rules to a first element corresponding to the first error and a second element corresponding to the second error. The rule(s) can be retained in one or more memory devices 1120 (referred to as error similarity rules 1120). The first error and the second error can be deemed to be similar when the first element and the second element satisfy the applied rule(s). In addition, or in other embodiments, the error similarity component 1110 can apply a machine-learning (ML) model to elements corresponding to respective errors in order to identify similar errors. For instance, the ML model can be trained using supervised learning to determine that a first error is similar to a second error.

The customization subsystem 240 included in the error analysis system 110 shown in FIG. 11 can configure at least one of the rule(s) utilized to evaluate the similarity of a first element and a second element corresponding to respective misclassification errors. To that end, in one embodiment, the customization subsystem 240 can include a component that can determine a similarity function that can operate on an element, such as textual element, an image, a video segment, a time series, or the like. Such a similarity function can take as argument(s) specific attributes of the element, such as number of words, number of pixels with a defined brightness, number of time intervals with a particular audio volume in a video segment, or similar attributes. The function can then determine one or several values representing a feature of the element. The customization subsystem 240 can then configure a threshold value. The similarity function and threshold value can constitute a similarity rule that can be applied by the error similarity component 1110, in some instances. For example, the rule can dictate that a first and second elements are similar when respective feature values of those elements differ by less than the threshold value.

Figure 12:
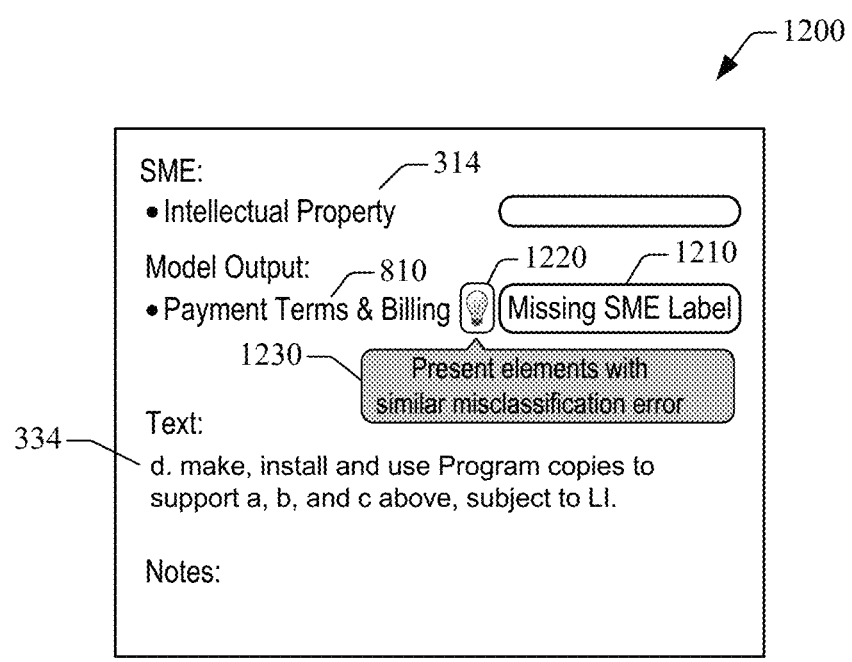
FIG. 12 presents a non-limiting example of a user interface that can permit identification of errors that are similar to a defined error of a classification model, in accordance with one or more embodiments described herein.

FIG. 12 illustrates a non-limiting example of a user interface 1200 that can permit identifying one or several errors that are similar to an error exhibiting a particular misclassification type, in accordance with one or more embodiments described herein. The user interface 1200 can include a selectable visual element 1210 that, in response to being selected, can permit determining a root cause of the error, in accordance with aspects described herein. The selectable visual element 1210 can be marked with a string of characters (e.g., "Missing SME Label") identifying a root cause that has been determined for the error.

The user interface 1200 also can include a selectable visual element 1220 that, in response to being selected, can cause the client device 120 to present elements with a similar misclassification error. Those elements can include a text fragment (such as a sentence, a clause, or similar) for example. In some instances, as is illustrated in FIG. 12, hovering over the selectable visual element 1020 can cause the client device 120 to present a description 1230 of the functionality associated with the selectable visual element 1220. To present those elements, the client device 120 can send a request message to the error analysis system 110 (FIG. 11) in response to selection of the selectable visual element 1220. The request message can include first payload data identifying a first element (e.g., the text 334) corresponding to the misclassification error represented by indicia included in the user interface 1200. The payload data also can include second data identifying the error root-cause ("Missing SME Label," for example) corresponding to the misclassification error. The error similarity component 1110 (FIG. 11) in the error analysis system 110 can receive the request message. In response, the error similarity component 1110 can identify one or several second elements having a same misclassification error, where each one of the second element(s) satisfies one or more similarity rules dictating similarity to the first element. The error similarity component 1110 can then send data defining the second element(s) to the client device 120. In some instances, the error similarity component 1110 also can send formatting data that can dictate a format for presentation of the second element(s). In some cases, the formatting data can include a formatting attribute indicating that the error root-caused utilized to determine similar errors is to be presented together with the second element(s).

Figure 13:
FIG. 13 presents a non-limiting example of a user interface that can permit identification of errors that are similar to a defined error of a classification model, in accordance with one or more embodiments described herein.

The client device 120 can receive the data defining the second element(s) and, in some instances, the formatting data. The client device 120 can then present a user interface that can include a listing of misclassification errors that are similar to the particular misclassification error represented by the user interface 1200 (FIG. 12), for example. FIG. 13 illustrates a non-limiting example of a user interface 1300 that presents a listing of misclassification errors similar to a particular misclassification error 1310 corresponding to a cell of a confusion matrix. The user interface 1300 includes a first pane 1320a including information representing a first similar misclassification error, a second pane 1320b including information representing a second similar misclassification error, and a third pane 1320c including information representing a third similar misclassification error. Each one of the first pane 1320a, second pane 1320b, and third pane 1320c includes a visual element 1330 identifying the error root-cause of the similar misclassification errors. Markings, such as a string of characters representing the error root-cause, can be populated automatically based on a formatting attribute received from the error similarity component 1110.

Figure 14:
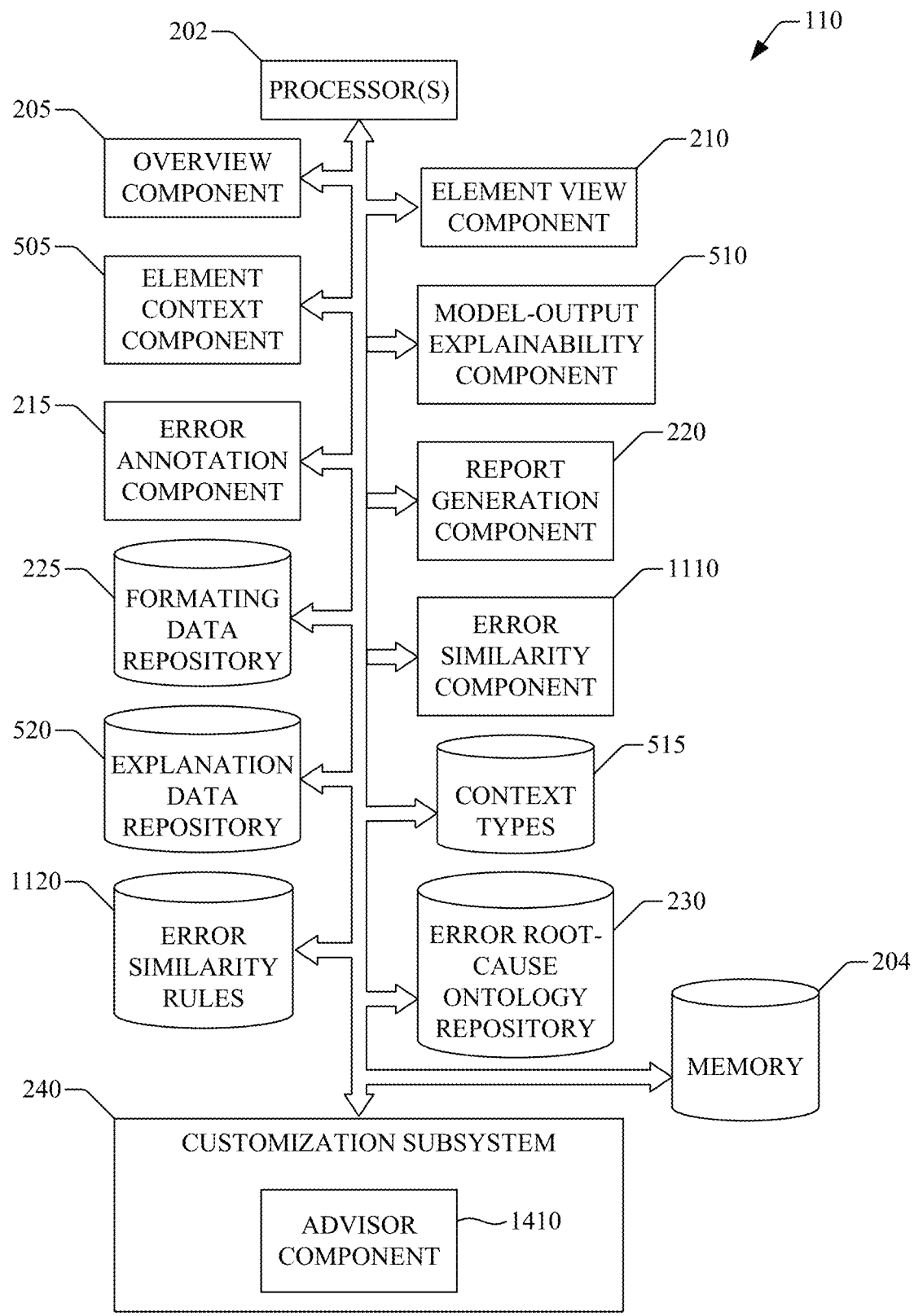
FIG. 14 is a block diagram of a non-limiting example of a system for analysis of errors of a predictive model, in accordance with one or more embodiments described herein.

As mentioned, the described technologies for analysis of errors of a predictive model can be customized in numerous ways. In some embodiments, as is illustrated in FIG. 14, the error analysis system 110 can include an advisor component 1410 that can generate a recommendation for a customization or can automatically implement a customization. To one or both of those ends, the advisor component 1460 can use one or a combination of input data, predictive model, or end-user input. In some embodiments, the advisor component 1410 can analyze data provided as input to the predictive model to determine (e.g., infer) a data type—e.g., text or image—of the data. Using the data type, the advisor component 1410 can then determine a group of formatting attributes that define a manner of visualizing the data. In addition, or as an alternative, the advisor component 1410 can use the data type to determine which contextual information to present.

In addition, or in other embodiments, the advisor component 1410 can analyze the predictive model to determine (e.g., infer) if the predictive model is a black-box model or a transparent model. To that point, the advisor component 1410 can analyze data or metadata, or both, that define or otherwise characterize the predictive model. Using the determined type, the advisor component 1410 can select a relevant and informative explainability technique to use. Prior to selecting the explainability technique, the advisor component 1410 can generate a relevancy ranking of explainability techniques and can then select a top ranked (e.g., most relevant) technique, second top ranked (e.g., second most relevant) explainability technique, or similar.

Figure 15:
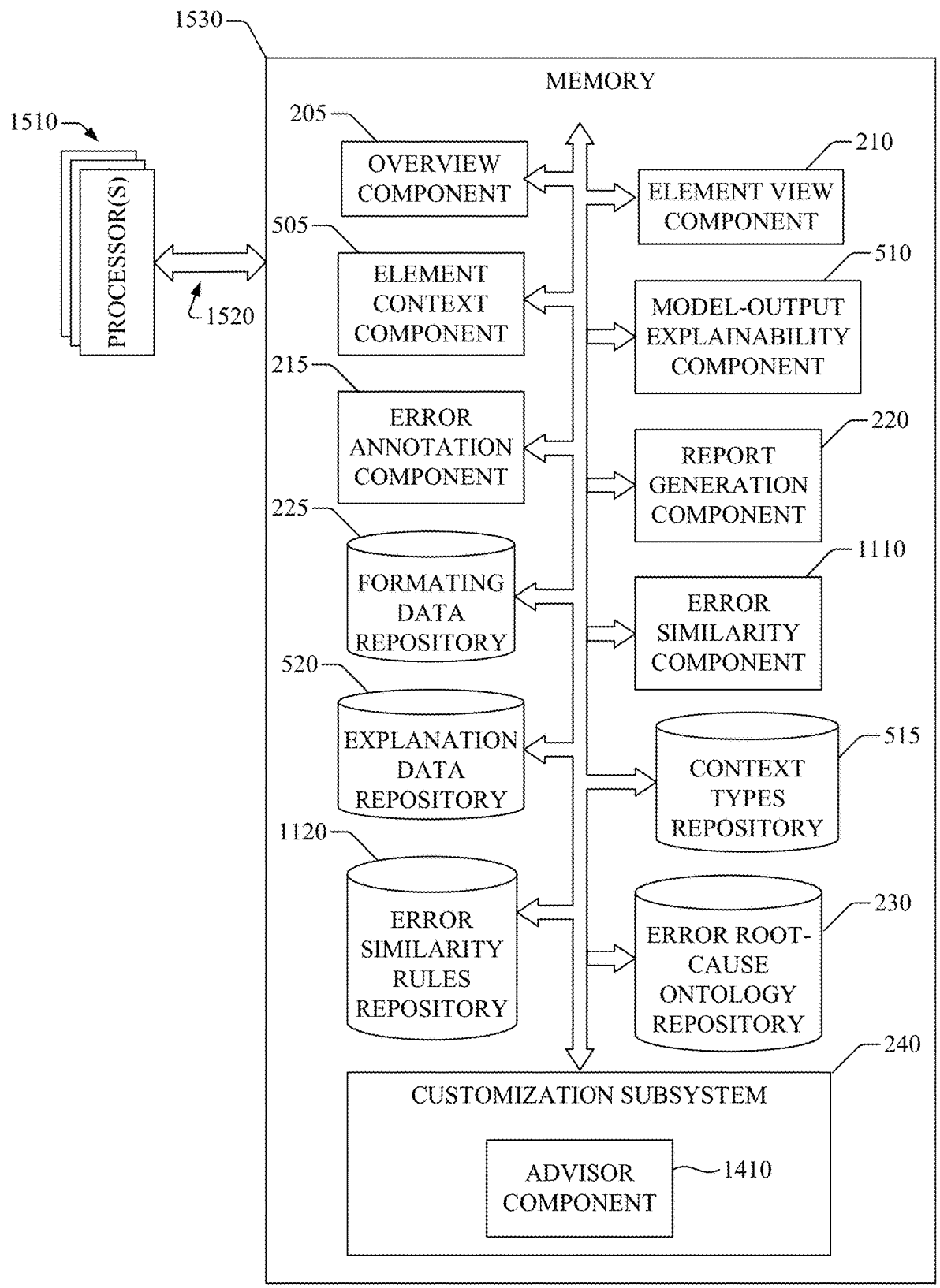
FIG. 15 is a block diagram of a non-limiting example of another system for analysis of errors of a predictive model, in accordance with one or more embodiments described herein.

Further, or in other embodiments, the advisor component 1410 can cause the client device 120 (FIG. 1) to present a prompt for end-user input data characterizing or several of a predictive task (such as classification), the predictive model, and types of data to which the predive model is applied. The advisor component 1410 can receive the end-user input data and can generate a customization to be recommended or implemented, or both FIG. 15 presents a block diagram of a non-limiting example of the error analysis system 110 in accordance with one or more embodiments described herein. As is illustrated in FIG. 15, the error analysis system 110 can include one or many processors 1510 and one or many memory devices 1530 (referred to as memory 1530). In some embodiments, the processor(s) 1510 can be arranged in a single computing apparatus (a blade server device or another type of server device, for example). In other embodiments, the processor(s) 1510 can be distributed across two or more computing apparatuses (e.g., multiple blade server devices or other types of server devices).

The one or many processors 1510 can be operatively coupled to the memory 1530 by means of one or many communication interfaces 1520, for example. The communication interface(s) 1520 can be suitable for the particular arrangement (localized or distributed) of the processor(s) 1510. In some embodiments, the communication interface(s) 1520 can include one or many bus architectures, such an Ethernet-based industrial bus, a controller area network (CAN) bus, a Modbus, other types of fieldbus architectures, or the like. In addition, or in other embodiments, the communication interface(s) can include a wireless network and/or a wireline network having respective footprints.

As is illustrated in FIG. 15, the memory 1530 can retain or otherwise store therein machine-accessible components (e.g., computer-readable and/or computer-executable components) in accordance with this disclosure. As such, in some embodiments, machine-accessible instructions (e.g., computer-readable and/or computer-executable instructions) embody or otherwise constitute each one of the machine-accessible components within the memory 1530. The machine-accessible instructions are encoded in the memory 1530 and can be arranged to form each one of the machine-accessible components. The machine-accessible instructions can be built (e.g., linked and compiled) and retained in computer-executable form in the memory 1530 (as is shown in FIG. 15) or in one or many other machine-accessible non-transitory storage media. Specifically, as is shown in FIG. 15, in some embodiments, the machine-accessible components include the overview component 205, the element view component 210, the element context component 305, the model-output explainability component 510, the error annotation component 215, the report generation component 220, and the error similarity component 1110.

The machine-accessible components, individually or in a particular combination, can be accessed and executed by at least one of the processor(s) 1510. In response to execution, each one of the machine-accessible components can provide the functionality described herein. Accordingly, execution of the computer-accessible components retained in the memory 1530 can cause the error analysis system 110 to operate in accordance with aspects described herein. More concretely, at least one of the processor(s) 1510 can execute the machine-accessible components to cause the error analysis system 110 to permit the analysis of errors of a classification model or other types of predictive models, in accordance with aspects of this disclosure.

Although not illustrated in FIG. 15, the error analysis system 110 also can include other types of computing resources that can permit or otherwise facilitate the execution of the machine-accessible components retained in the memory 1530. Those computing resources can include, for example, CPUs, GPUs, TPUs, memory, disk space, incoming bandwidth, and/or outgoing bandwidth, interface(s) (such as I/O interfaces); controller devices(s); power supplies; and the like. For instance, the memory 1530 also can include programming interface(s) (such as application programming interfaces (APIs)); an operating system; software for configuration and or control of a virtualized environment; firmware; and the like.

Figure 16:
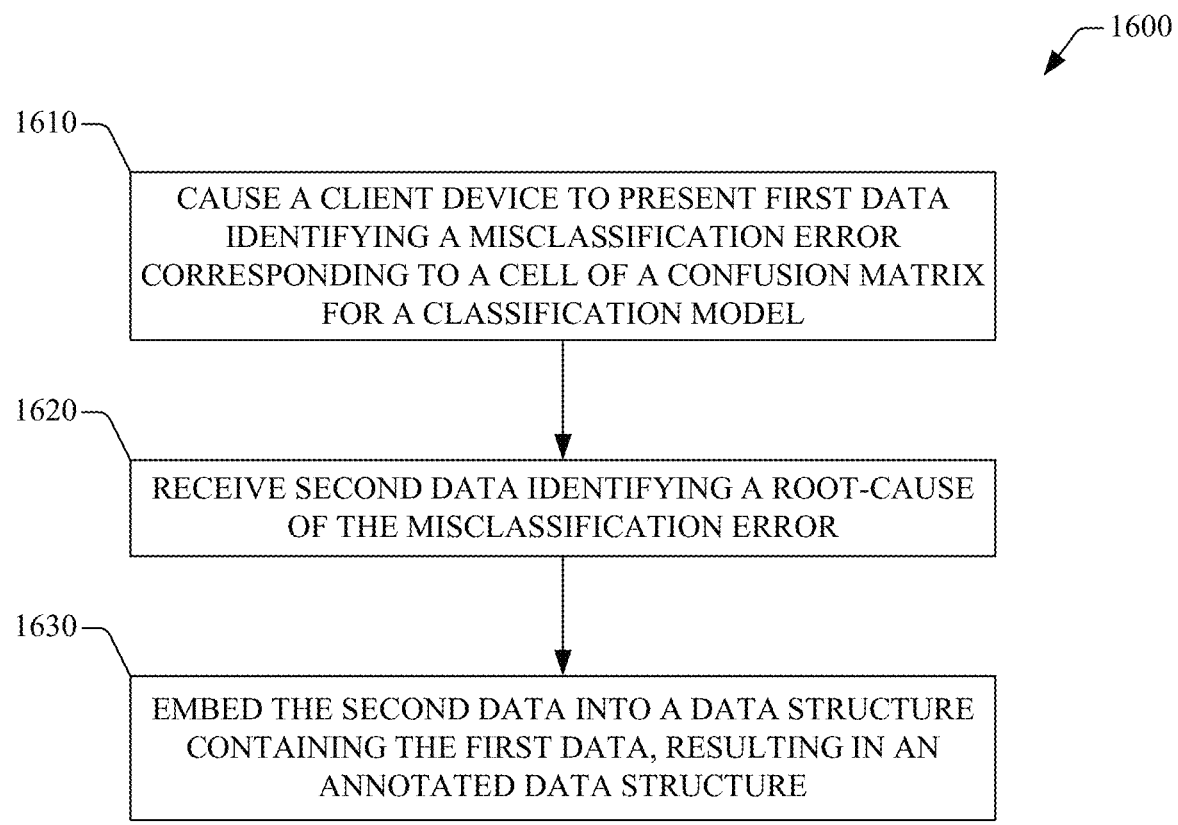
FIG. 16 presents a non-limiting example of a method for generating a record of a root-cause of an error of a classification model, in accordance with one or more embodiments described herein.

FIG. 16 presents a non-limiting example of a method for generating a record of a root-cause of a misclassification error of a classification model, in accordance with one or more embodiments described herein. A computing system can implement the example method 1600. Implementing the method 1600 can include compiling or executing, or both, one or several of the blocks included in the method 1600, for example. At block 1610, the computing system can cause (via the overview component 205 or the element view component 210, for example) a client device to present first data identifying a misclassification error corresponding to a cell of a confusion matrix for a classification model. The misclassification error represents a mismatch between a label generated for an element (e.g., a sentence) by the classification model and another label corresponding to a ground-truth observation for that element. The client device can be embodied in, or can include, the client device 120.

At block 1620, the computing system can receive (via the element view component 210, for example) second data identifying a root-cause of the misclassification error. At block 1630, the computing system can embed (via the error annotation component 215, for example) the second data into a data structure containing the first data, resulting in an annotated data structure. The annotated data structure constitutes the record of the root-cause of the misclassification error.

Figure 17:
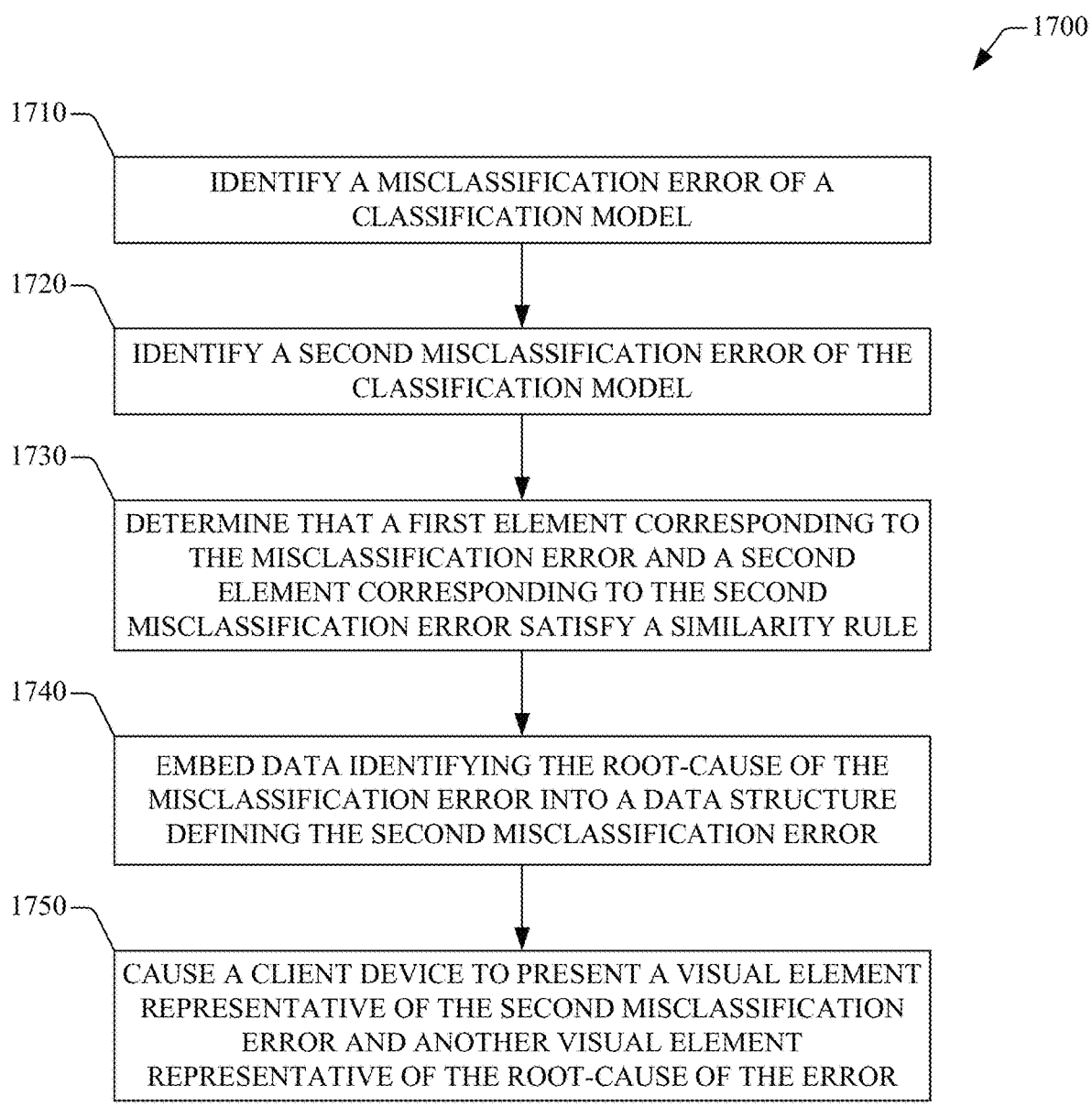
FIG. 17 presents a non-limiting example of a method for identifying errors of a classification model that are similar to a particular error of the classification model, in accordance with one or more embodiments described herein.

FIG. 17 presents a non-limiting example of a method for identifying errors of a classification model that are similar to a particular error of the classification model, in accordance with one or more embodiments described herein. The computing system that can implement the example method 1600 also can implement the example method 1700. Implementing the method 1700 can include compiling or executing, or both, one or several of the blocks included in the method 1700, for example. At block 1710, the computing system can identify (via the element view component 210, for example) a misclassification error of a classification model. At block 1720, the computing system can identify (via the element view component 210, for example) a second misclassification error of the classification model. At block 1730, the computing system can determine (via the error similarity component 1110, for example) that a first element corresponding to the misclassification error and a second element corresponding to the second misclassification error satisfy a similarity rule.

At block 1740, the computing system can embed (via the error annotation component 215, for example) data identifying the root-cause of the misclassification error into a data structure defining the second misclassification error. At block 1750, the computing system can cause (via the report generation component 220, for example) a client device to present a visual element representative of the second misclassification error and another visual element representative of the root-cause of the error. The client device can be embodied in, or can include, the client device 120.

Figure 18:
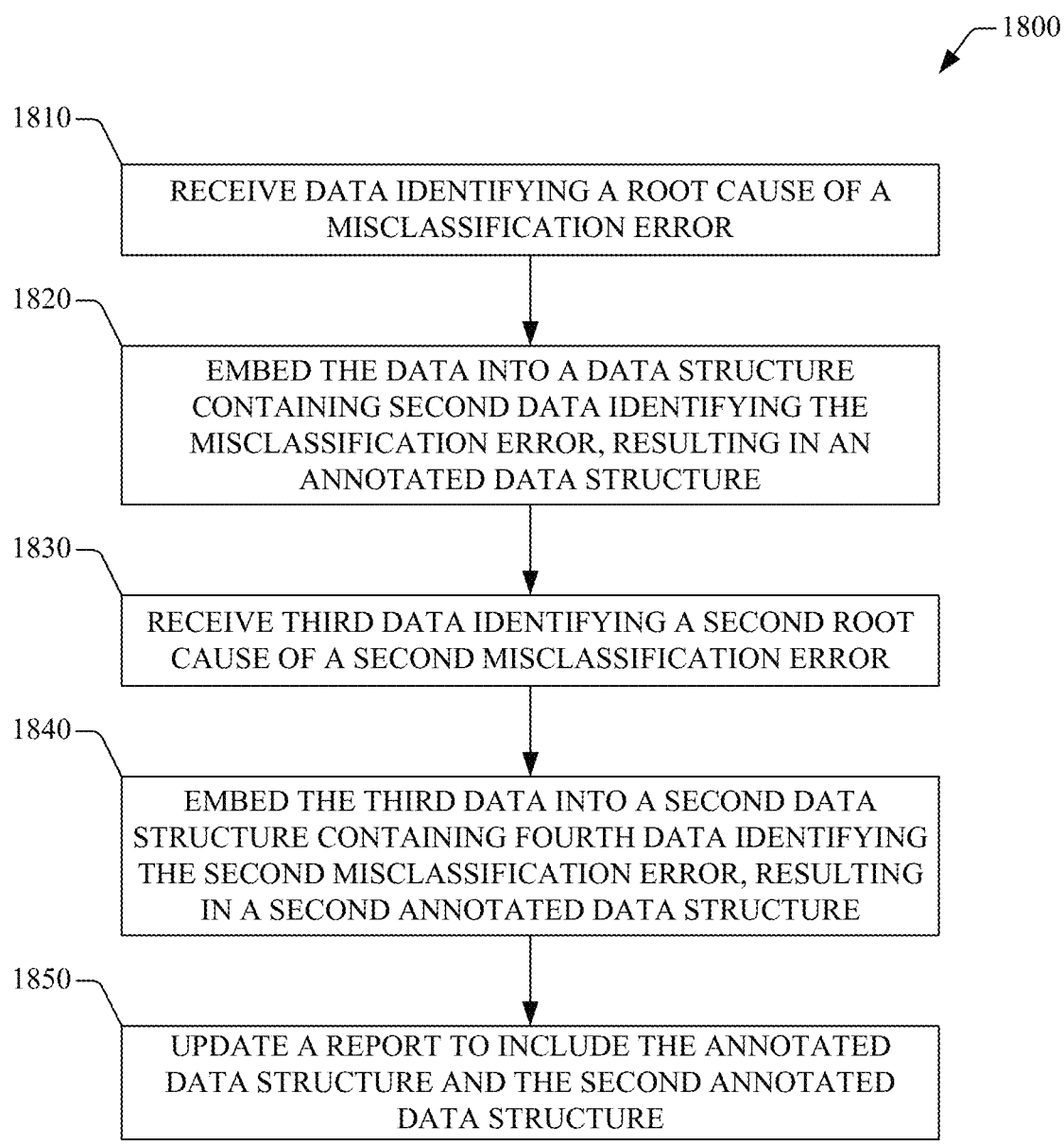
FIG. 18 presents a non-limiting example of a method for generating a report of errors of a classification model, in accordance with one or more embodiments described herein.

FIG. 18 presents a non-limiting example of a method for generating a report of misclassification errors of a classification model, in accordance with one or more embodiments described herein. The computing system that can implement the example method 1700 also can implement the example method 1800. Implementing the method 1800 can include compiling or executing, or both, one or several of the blocks included in the method 1800, for example. At block 1810, the computing system can receive (via the element view component 210, for example) data identifying a root cause of a misclassification error. At block 1820, the computing system can embed (via the error annotation component 215, for example) the data into a data structure containing second data identifying the misclassification error, resulting in an annotated data structure. At block 1830, the computing system can receive (via the element view component 210, for example) third data identifying a second root cause of a second misclassification error. At block 1840, the computing system can embed (via the error annotation component 215, for example) the third data into a second data structure containing fourth data identifying the second misclassification error, resulting in a second annotated data structure. At block 1850, the computing system can update (via the report generation component 220, for example) a report to include the annotated data structure and the second annotated data structure. In some instances, updating the report can include generating a new report to include the first annotated data structure or the second annotated data structure, or both. In addition, or in other instances, updating the report can include modifying an extant report to include the first annotated data structure or the second annotated data structure, or both.

Figure 19:
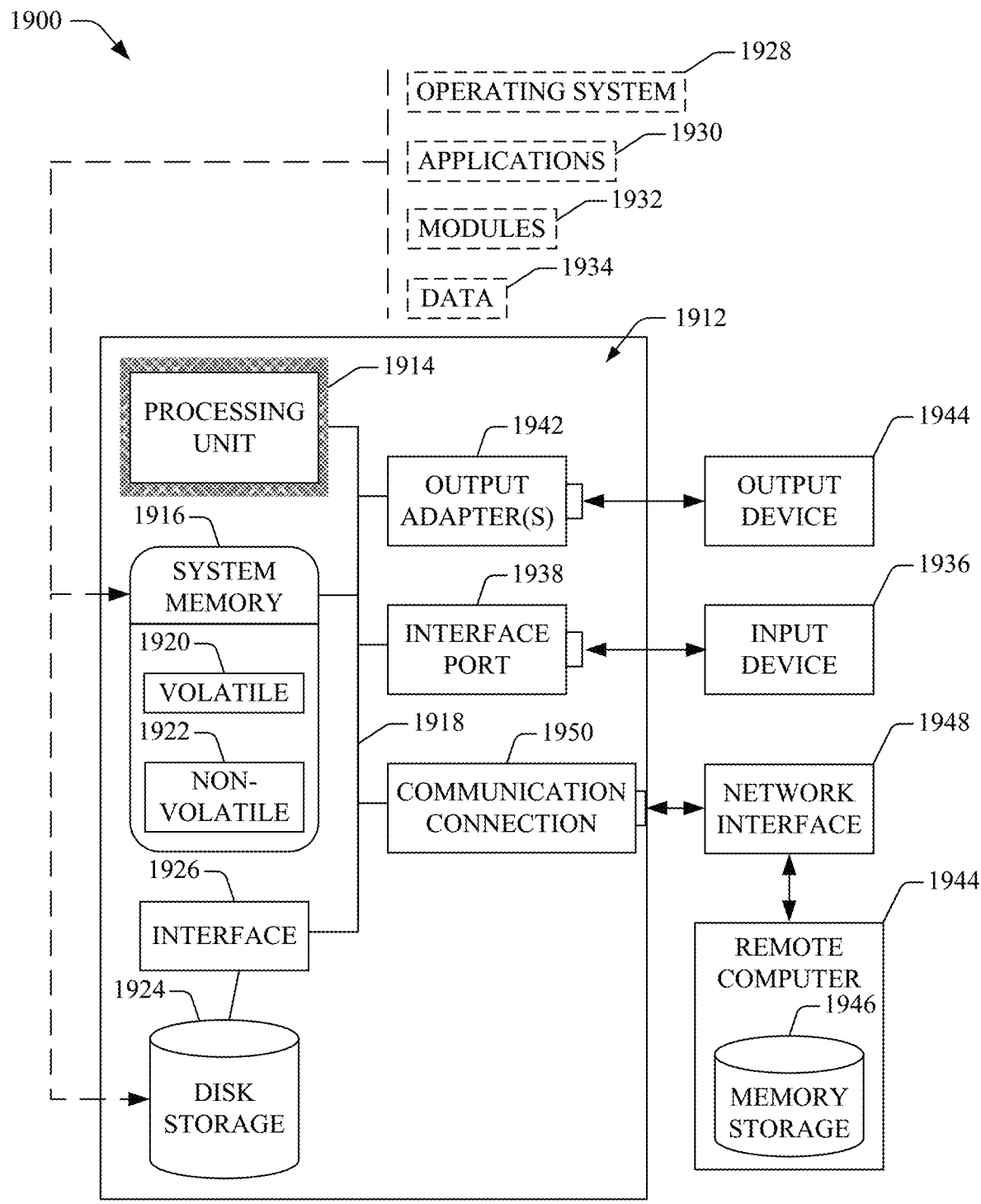
FIG. 19 is a block diagram of an example, non-limiting operating environment in which one or more embodiments described herein can be facilitated.

In order to provide a context for the various aspects of the disclosed subject matter, FIG. 19 as well as the following discussion are intended to provide a general description of a suitable environment in which the various aspects of the disclosed subject matter can be implemented. FIG. 19 illustrates a block diagram of an example, non-limiting operating environment in which one or more embodiments described herein can be facilitated. Repetitive description of like elements employed in other embodiments described herein is omitted for sake of brevity. With reference to FIG. 19, a suitable operating environment 1900 for implementing various aspects of this disclosure can include a computer 1912. The computer 1912 can also include a processing unit 1914, a system memory 1916, and a system bus 1918. The system bus 1918 can operably couple system components including, but not limited to, the system memory 1916 to the processing unit 1914. The processing unit 1914 can be any of various available processors. Dual microprocessors and other multiprocessor architectures also can be employed as the processing unit 1914. The system bus 1918 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1916 can also include volatile memory 1920 and nonvolatile memory 1922. The basic input/output system (BIOS), containing the basic routines to transfer information between elements within the computer 1912, such as during start-up, can be stored in nonvolatile memory 1922. By way of illustration, and not limitation, nonvolatile memory 1922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1912 can also include removable/non-removable, volatile/non-volatile computer storage media. FIG. 19 illustrates, for example, a disk storage 1924. Disk storage 1924 can also include, but is not limited to, devices like a magnetic disk drive, floppy disk drive, tape drive, Jaz drive, Zip drive, LS-100 drive, flash memory card, or memory stick. The disk storage 1924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface can be used, such as interface 1926. FIG. 19 also depicts software that can act as an intermediary between users and the basic computer resources described in the suitable operating environment 1900. Such software can also include, for example, an operating system 1928. Operating system 1928, which can be stored on disk storage 1924, acts to control and allocate resources of the computer 1912. System applications 1930 can take advantage of the management of resources by operating system 1928 through program modules 1932 and program data 1934, e.g., stored either in system memory 1916 or on disk storage 1924. It is to be appreciated that this disclosure can be implemented with various operating systems or combinations of operating systems. A user enters commands or information into the computer 1912 through one or more input devices 1936. Input devices 1936 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1914 through the system bus 1918 via one or more interface ports 1938. The one or more Interface ports 1938 can include, for example, a serial port, a parallel port, a game port, and a universal serial bus (USB). One or more output devices 1940 can use some of the same type of ports as input device 1936. Thus, for example, a USB port can be used to provide input to computer 1912, and to output information from computer 1912 to an output device 1940. Output adapter 1942 can be provided to illustrate that there are some output devices 1940 like monitors, speakers, and printers, among other output devices 1940, which require special adapters. The output adapters 1942 can include, by way of illustration and not limitation, video and sound cards that provide a means of connection between the output device 1940 and the system bus 1918. It should be noted that other devices and/or systems of devices provide both input and output capabilities such as one or more remote computers 1944.

Computer 1912 can operate in a networked environment using logical connections to one or more remote computers, such as remote computer 1944. The remote computer 1944 can be a computer, a server, a router, a network PC, a workstation, a microprocessor based appliance, a peer device or other common network node and the like, and typically can also include many or all of the elements described relative to computer 1912. For purposes of brevity, only a memory storage device 1946 is illustrated with remote computer 1944. Remote computer 1944 can be logically connected to computer 1912 through a network interface 1948 and then physically connected via communication connection 1950. Further, operation can be distributed across multiple (local and remote) systems. Network interface 1948 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1950 refers to the hardware/software employed to connect the network interface 1948 to the system bus 1918. While communication connection 1950 is shown for illustrative clarity inside computer 1912, it can also be external to computer 1912. The hardware/software for connection to the network interface 1948 can also include, for exemplary purposes only, internal and external technologies such as, modems including regular telephone grade modems, cable modems and DSL modems, ISDN adapters, and Ethernet cards.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In order to provide a context for the various aspects of the disclosed subject matter, FIG. 19 as well as the following discussion are intended to provide a general description of a suitable environment in which the various aspects of the disclosed subject matter can be implemented. FIG. 19 illustrates a block diagram of an example, non-limiting operating environment in which one or more embodiments described herein can be facilitated. Repetitive description of like elements employed in other embodiments described herein is omitted for sake of brevity. With reference to FIG. 19, a suitable operating environment 1900 for implementing various aspects of this disclosure can include a computer 1912. The computer 1912 can also include a processing unit 1914, a system memory 1916, and a system bus 1918. The system bus 1918 can operably couple system components including, but not limited to, the system memory 1916 to the processing unit 1914. The processing unit 1914 can be any of various available processors. Dual microprocessors and other multiprocessor architectures also can be employed as the processing unit 1914. The system bus 1918 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1916 can also include volatile memory 1920 and nonvolatile memory 1922. The basic input/output system (BIOS), containing the basic routines to transfer information between elements within the computer 1912, such as during start-up, can be stored in nonvolatile memory 1922. By way of illustration, and not limitation, nonvolatile memory 1922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1912 can also include removable/non-removable, volatile/non-volatile computer storage media. FIG. 19 illustrates, for example, a disk storage 1924. Disk storage 1924 can also include, but is not limited to, devices like a magnetic disk drive, floppy disk drive, tape drive, Jaz drive, Zip drive, LS-100 drive, flash memory card, or memory stick. The disk storage 1924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface can be used, such as interface 1926. FIG. 19 also depicts software that can act as an intermediary between users and the basic computer resources described in the suitable operating environment 1900. Such software can also include, for example, an operating system 1928. Operating system 1928, which can be stored on disk storage 1924, acts to control and allocate resources of the computer 1912. System applications 1930 can take advantage of the management of resources by operating system 1928 through program modules 1932 and program data 1934, e.g., stored either in system memory 1916 or on disk storage 1924. It is to be appreciated that this disclosure can be implemented with various operating systems or combinations of operating systems. A user enters commands or information into the computer 1912 through one or more input devices 1936. Input devices 1936 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1914 through the system bus 1918 via one or more interface ports 1938. The one or more Interface ports 1938 can include, for example, a serial port, a parallel port, a game port, and a universal serial bus (USB). One or more output devices 1940 can use some of the same type of ports as input device 1936. Thus, for example, a USB port can be used to provide input to computer 1912, and to output information from computer 1912 to an output device 1940. Output adapter 1942 can be provided to illustrate that there are some output devices 1940 like monitors, speakers, and printers, among other output devices 1940, which require special adapters. The output adapters 1942 can include, by way of illustration and not limitation, video and sound cards that provide a means of connection between the output device 1940 and the system bus 1918. It should be noted that other devices and/or systems of devices provide both input and output capabilities such as one or more remote computers 1944.

Computer 1912 can operate in a networked environment using logical connections to one or more remote computers, such as remote computer 1944. The remote computer 1944 can be a computer, a server, a router, a network PC, a workstation, a microprocessor based appliance, a peer device or other common network node and the like, and typically can also include many or all of the elements described relative to computer 1912. For purposes of brevity, only a memory storage device 1946 is illustrated with remote computer 1944. Remote computer 1944 can be logically connected to computer 1912 through a network interface 1948 and then physically connected via communication connection 1950. Further, operation can be distributed across multiple (local and remote) systems. Network interface 1948 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1950 refers to the hardware/software employed to connect the network interface 1948 to the system bus 1918. While communication connection 1950 is shown for illustrative clarity inside computer 1912, it can also be external to computer 1912. The hardware/software for connection to the network interface 1948 can also include, for exemplary purposes only, internal and external technologies such as, modems including regular telephone grade modems, cable modems and DSL modems, ISDN adapters, and Ethernet cards.

In some embodiments, the various embodiments of the error analysis system 110 described herein can be associated with a cloud computing environment. For example, vulnerability risk assessment system 102 can be associated with cloud computing environment 1650 as is illustrated in FIG. 16 and/or one or more functional abstraction layers described herein with reference to FIG. 17 (e.g., hardware and software layer 1760, virtualization layer 1770, management layer 1780, and/or workloads layer 1790).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 20:
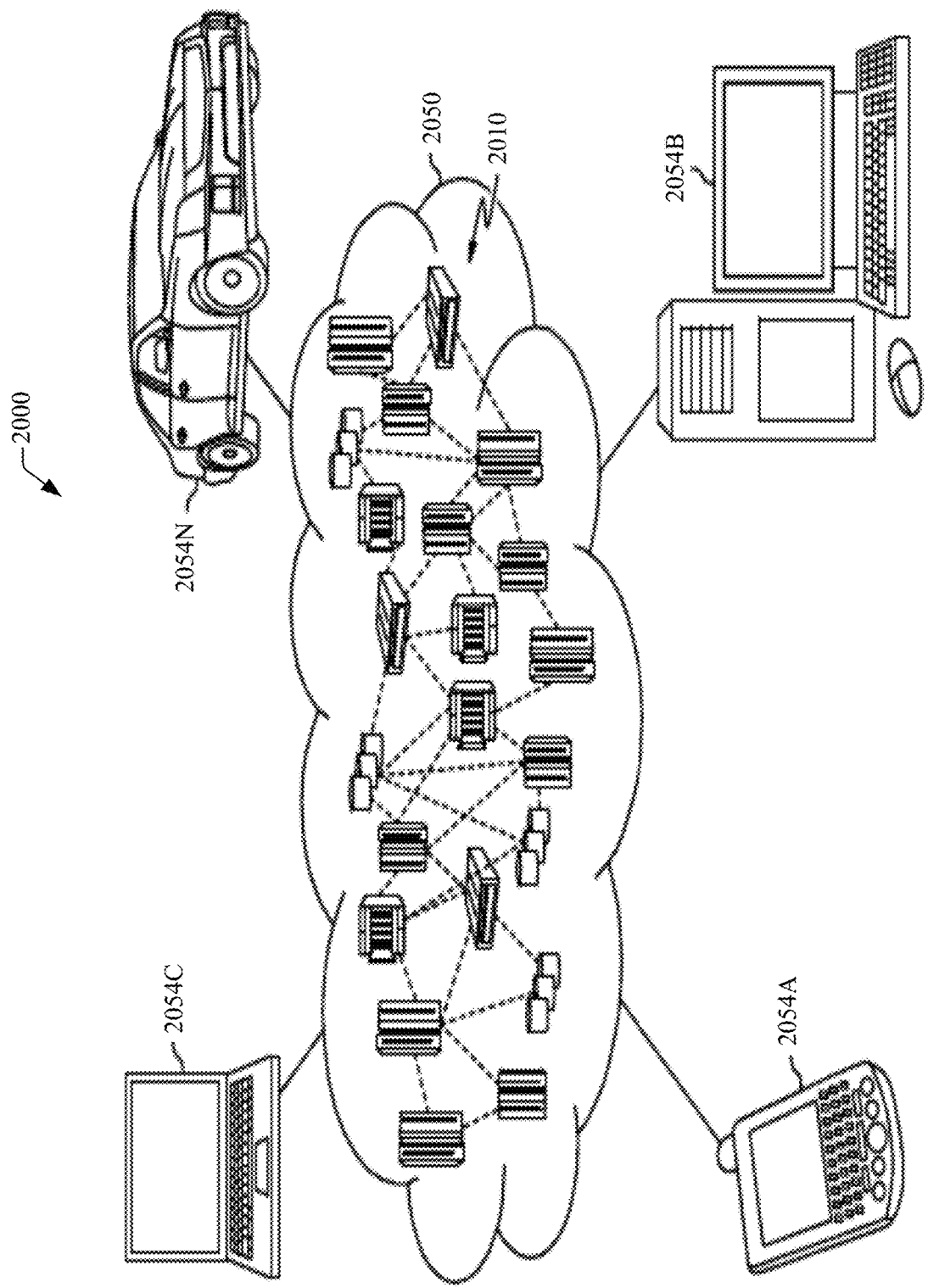
FIG. 20 is a block diagram of a non-limiting example of a cloud computing environment in accordance with one or more embodiments described herein.

Referring now to FIG. 20 an illustrative cloud computing environment 2050 is depicted. As shown, cloud computing environment 1650 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Although not illustrated in FIG. 20, cloud computing nodes 2010 can further comprise a quantum platform (e.g., quantum computer, quantum hardware, quantum software, and/or another quantum platform) with which local computing devices used by cloud consumers can communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 20 are intended to be illustrative only and that computing nodes 2010 and cloud computing environment 2050 can communicate with any type of computerized device over any type of network and/or network addressable connection (e.g., using a web browser).

Figure 21:
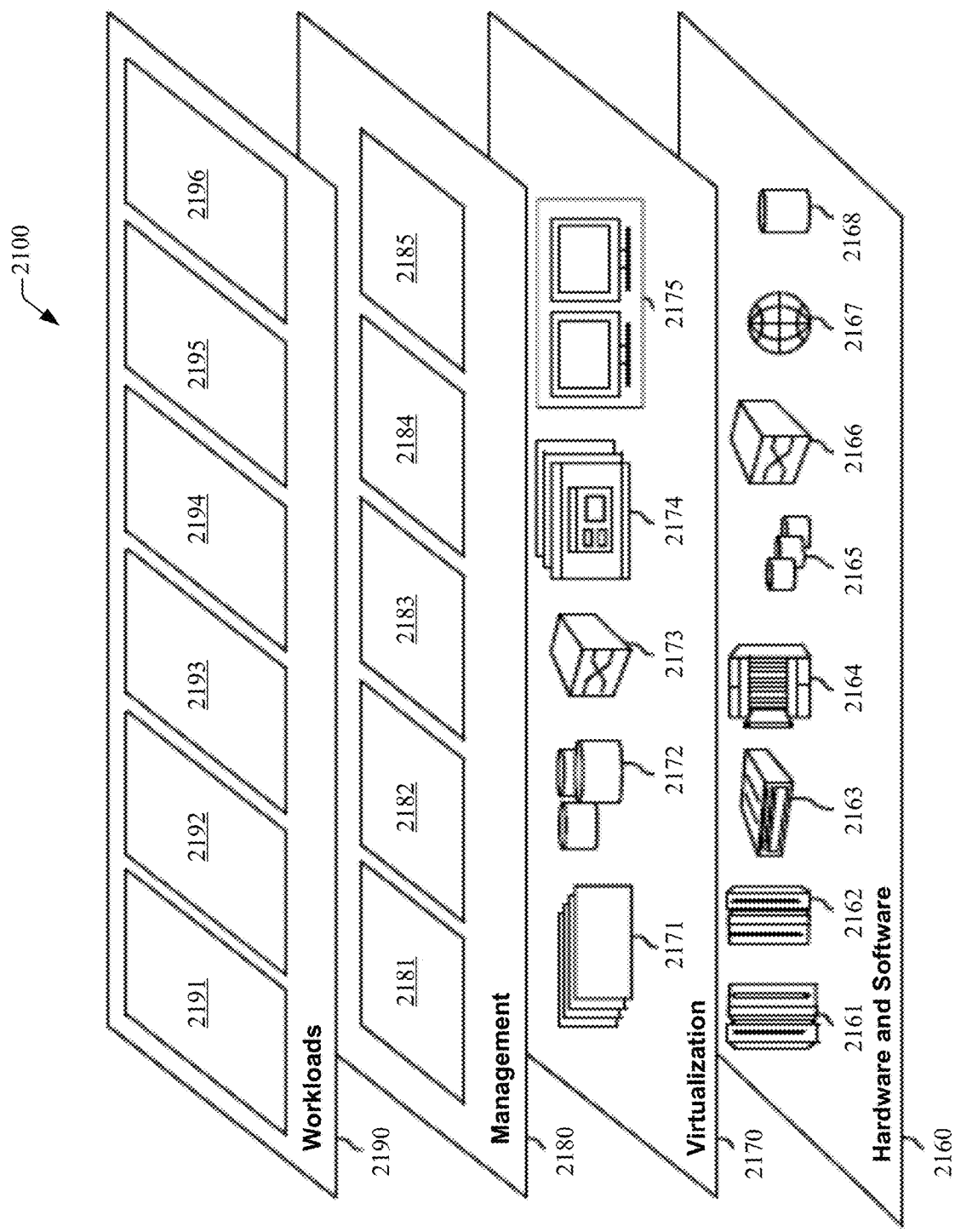
FIG. 21 is a block diagram of a non-limiting example of abstraction model layers in accordance with one or more embodiments described herein.

Referring now to FIG. 21, a set of functional abstraction layers provided by cloud computing environment 2050 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 2160 include hardware and software components. Examples of hardware components include: mainframes 2161; RISC (Reduced Instruction Set Computer) architecture based servers 2162; servers 2163; blade servers 2164; storage devices 2165; and networks and networking components 2166. In some embodiments, software components include network application server software 2167, database software 2168, quantum platform routing software (not illustrated in FIG. 21), and/or quantum software (not illustrated in FIG. 21).

Virtualization layer 2170 provides an abstraction layer from which the following examples of virtual entities may be provided: virtual servers 2171; virtual storage 2172; virtual networks 2173, including virtual private networks; virtual applications and operating systems 2174; and virtual clients 2175.

In one example, management layer 2180 may provide the functions described below. Resource provisioning 2181 provides dynamic procurement of computing resources and other resources that are utilized to perform tasks within the cloud computing environment. Metering and pricing 2182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2183 provides access to the cloud computing environment for consumers and system administrators. Service level management 2184 provides cloud computing resource allocation and management such that required service levels are met. Service Level Agreement (SLA) planning and fulfillment 2185 provide pre-arrangement for, and procurement of, cloud computing resources for which a future requirement is anticipated in accordance with an SLA.

Workloads layer 2190 provides examples of functionality for which the cloud computing environment may be utilized. Non-limiting examples of workloads and functions which may be provided from this layer include: mapping and navigation 2191; software development and lifecycle management 2192; virtual classroom education delivery 2193; data analytics processing 2194; transaction processing 2195; and vulnerability risk assessment software 2196.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer-executable components; and
a processor, operatively coupled to the memory, that executes the computer-executable components, the computer-executable components comprising:
an overview component that causes a client device to present first data identifying an error corresponding to a cell of a confusion matrix for a classification model, the error representing a mismatch between a first label generated by the classification model and a second label corresponding to a ground-truth observation;
an element view component that receives second data defining a root cause of the error;
an error annotation component that embeds the second data into a first data structure containing the first data, resulting in a first annotated data structure, and;
an error analysis component that trains a machine learning model, using the first data structure, to identify respective root causes of errors and annotate the errors with the respective root causes.

2. The system of claim 1, wherein the overview component further causes the client device to:
present an array of selectable visual elements representing the confusion matrix; and
receive a selection of a first selectable visual element within an array, the first selectable visual element representing the cell.

3. The system of claim 1, wherein the element view component causes the client device to present a menu of error root-causes, an item in the menu corresponding to an ontology of error root causes, and wherein the root cause of the error corresponds to a particular item in the menu.

4. The system of claim 1, wherein the element view component causes the client device to present a menu of error root-causes, the system further comprising a recommendation component that generates an item in the menu using a group of historical error-root causes.

5. The system of claim 1, wherein the element view component further causes the client device to present general information about the error, the general information comprising at least one of content of an element corresponding to the error, output of the classification model for the element, or a ground-truth datum for the element.

6. The system of claim 1, further comprising an element context component that causes the client device to present contextual information about the error, the contextual information comprising data defining knowledge to infer a correct prediction for an element corresponding to the error.

7. The system of claim 1, further comprising a model-output explainability component that causes the client device to present an explanation of how the classification model yielded the error, wherein the explanation comprises at least one of a decision tree, a rule, a logic program, or an attention weight on one or more features that contributed to yielding the error.

8. The system of claim 1, further comprising an error similarity component that:
generates third data identifying a second error representing another mismatch between a third label generated by the classification model and a fourth label corresponding to a second ground-truth observation, wherein the second error satisfies a similarity rule that dictates similarity to the error or results from application of a similarity model;
embeds the second data into a second data structure containing the third data; and
causes the client device to present a visual element representative of the second error and a second visual element representative of the root cause of the error.

9. The system of claim 1, wherein the element view component receives third data defining a second root cause of a second error representing another mismatch between a third label generated by the classification model and a fourth label corresponding to a second ground-truth observation, and wherein the error annotation component embeds the third data into a second data structure containing fourth data defining the second error, resulting in a second annotated data structure, the system further comprising a report generation component that updates a report to include the first annotated data structure and the second annotated data structure.

10. A computer-implemented method, comprising:
causing, by a computing system operatively coupled to a processor, a client device to present first data identifying an error corresponding to a cell of a confusion matrix for a classification model, the error representing a mismatch between a first label generated by the classification model and a second label corresponding to a ground-truth observation;
receiving, by the computing system, second data identifying a root cause of the error;
embedding, by the computing system, the second data into a first data structure containing the first data, resulting in a first annotated data structure; and
training, by the computing system, a machine learning model, using the first data structure, to identify respective root causes of errors and annotate the errors with the respective root causes.

11. The computer-implemented method of claim 10, wherein the causing comprises receiving a selection of a first selectable visual element within an array of selectable visual elements representing the confusion matrix, and wherein the first selectable visual element represents the cell.

12. The computer-implemented method of claim 10, wherein the receiving the second data comprises one or more of:
receiving selection data identifying a first element of an ontology of error root causes; or
receiving historical data defining a second element from a group of historical error-root causes.

13. The computer-implemented method of claim 10, wherein presenting the first data comprises one or more of:
presenting general information about the error;
presenting contextual information about the error; or
presenting an explanation of how the classification model yielded the error.

14. The computer-implemented method of claim 10, further comprising:
generating, by the computing system, third data identifying a second error representing another mismatch between a third label generated by the classification model and a fourth label corresponding to a second ground-truth observation, wherein the second error satisfies a similarity rule that dictates similarity to the error or results from application of a similarity model;
embedding, by the computing system, the second data into a second data structure containing the third data; and
causing, by the computing system, the client device to present a visual element representative of the second error and a second visual element representative of the root cause of the error.

15. The computer-implemented method of claim 10, further comprising:
receiving, by the computing system, third data defining a second root cause of a second error representing another mismatch between a third label generated by the classification model and a fourth label corresponding to a second ground-truth observation;

embedding, by the computing system, the third data into a second data structure containing fourth data identifying the second error, resulting in a second annotated data structure; and
updating, by the computing system, a report to include the first annotated data structure and the second annotated data structure.

16. A computer program product for analysis of an error of a classification model, the computer program product comprising a computer-readable storage medium having program instructions embodied therewith, the program instructions executable by a processor to cause the processor to:
cause, by the processor, a client device to present first data identifying the error corresponding to a cell of a confusion matrix for the classification model, the error representing a mismatch between a first label generated by the classification model and a second label corresponding to a ground-truth observation;
receive, by the processor, second data identifying a root cause of the error;
embedding, by the processor, the second data into a first data structure containing the first data, resulting in a first annotated data structure; and
training, by the processor, a machine learning model, using the first data structure, to identify respective root causes of errors and annotate the errors with the respective root causes.

17. The computer program product of claim 16, wherein the causing comprises receipt of a selection of a first selectable visual element within an array of selectable visual elements representing the confusion matrix, and wherein the first selectable visual element represents the cell.

18. The computer program product of claim 16, wherein the receipt of the second data comprises one or more of,
receipt of selection data identifying a first element of an ontology of error root causes; or
receipt of a historical data defining a second element from a group of historical error-root causes.

19. The computer program product of claim 16, wherein presentation of the first data comprises one or more of:
presentation, by the processor, of general information about the error;
presentation, by the processor, of contextual information about the error; or
presentation, by the processor, of an explanation of how the classification model yielded the error.

20. The computer program product of claim 16, wherein the program instructions are further executable by the processor to cause the processor to:
generate, by the processor, third data identifying a second error representing another mismatch between a third label generated by the classification model and a fourth label corresponding to a second ground-truth observation, wherein the second error satisfies a similarity rule that dictates similarity to the error;
embed, by the processor, the second data into a second data structure containing the third data; and
cause, by the processor, the client device to present a visual element representative of the second error and a second visual element representative of the root cause of the error.

* * * * *